United States Patent [19]

Heath

[11] Patent Number: 4,509,113
[45] Date of Patent: Apr. 2, 1985

[54] PERIPHERAL INTERFACE ADAPTER CIRCUIT FOR USE IN I/O CONTROLLER CARD HAVING MULTIPLE MODES OF OPERATION

[75] Inventor: Chester A. Heath, Boca Raton, Fla.

[73] Assignee: International Business Machines Corporation, Armonk, N.Y.

[21] Appl. No.: 345,177

[22] Filed: Feb. 2, 1982

[51] Int. Cl.³ .............................................. G06F 3/00
[52] U.S. Cl. .................................................. 364/200
[58] Field of Search ............................... 364/200, 900

[56] References Cited

U.S. PATENT DOCUMENTS

| | | | |
|---|---|---|---|
| 3,673,576 | 6/1972 | Donaldson, Jr. | 364/200 |
| 4,028,682 | 6/1977 | Weber et al. | 364/200 |
| 4,096,565 | 6/1978 | Ruckdescchel et al. | 364/200 |
| 4,126,897 | 11/1978 | Capowski et al. | 364/200 |
| 4,177,511 | 12/1979 | Taddei | 364/200 |
| 4,218,740 | 8/1980 | Bennett et al. | 364/200 |
| 4,246,637 | 1/1981 | Brown et al. | 364/200 |
| 4,271,466 | 6/1981 | Yamamoto et al. | 364/200 |
| 4,271,480 | 6/1981 | Vinot | 364/200 |
| 4,272,829 | 6/1981 | Schmidt et al. | 364/200 |
| 4,276,611 | 6/1981 | Jansen et al. | 364/200 |
| 4,280,193 | 7/1981 | Baun et al. | 364/900 |
| 4,283,760 | 8/1981 | Kita et al. | 364/200 |
| 4,290,106 | 9/1981 | Catiller et al. | 364/200 |
| 4,296,464 | 10/1981 | Woods et al. | 364/200 |
| 4,303,990 | 12/1981 | Seipp | 364/900 |
| 4,307,447 | 12/1981 | Provanzano et al. | 364/200 |
| 4,309,754 | 1/1982 | Dinwiddie, Jr. | 364/200 |
| 4,321,665 | 3/1982 | Shen et al. | 364/200 |

OTHER PUBLICATIONS

IBM Invention Disclosure RO8-80-0180, by R. M. Braid et al., entitled "Variable Channel Bandwidth Scheme".

Primary Examiner—Raulfe B. Zache
Attorney, Agent, or Firm—Robert Lieber

[57] ABSTRACT

This adapter contains two separately controllable sections, each transferring data in various formats between a peripheral device interface and either a microprocessor contained in an associated I/O controller or a host processor or both. Dedicated controls enable the adapter to operate autonomously after being prepared by the microprocessor. Separate but interconnectable handshaking controls enable the sections to operate either asynchronously or in time coordination with each other. Handshaking controls in plural adapters are interconnectable to coordinate related transfers of data between a device and one or more hosts via plural adapter paths. Programmable commands enable the microprocessor to condition the adapter to conduct various data transfers autonomously. Such data can be transferred to or from the device interface in various bit-parallel formats defined by the commands, and from or to the host processor, the microprocessor, or both the host processor and microprocessor concurrently. In one handshaking mode, the adapter sustains an array indexing operation in which one section transfers "address" data to a device and the other section transfers "addressed" portions of a data array between the same device and either the host processor or the microprocessor.

12 Claims, 17 Drawing Figures

FIG. 4
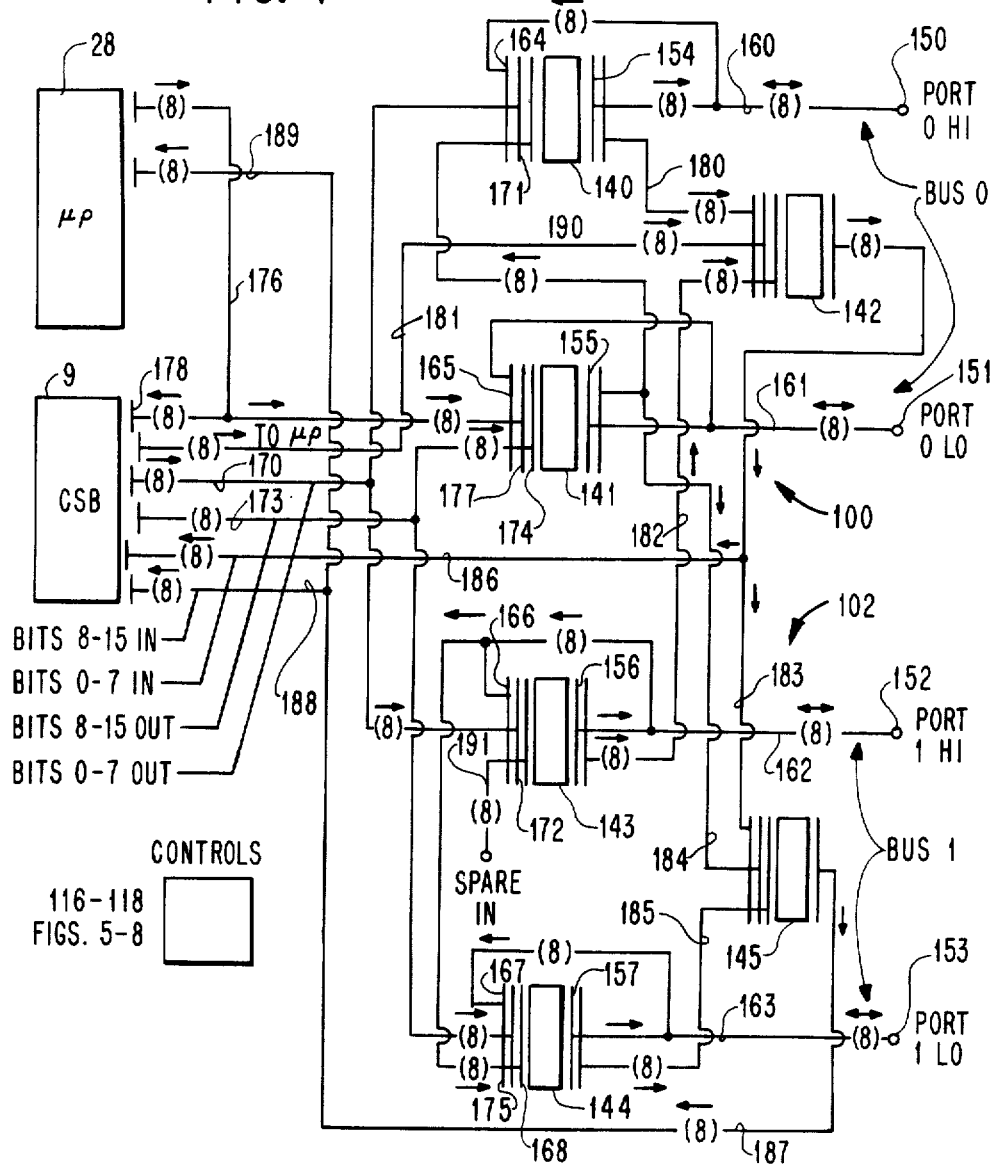
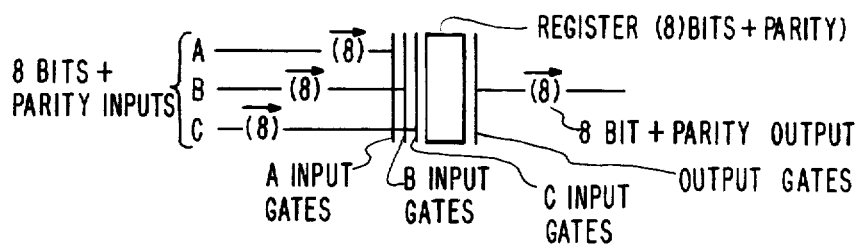
LEGEND:

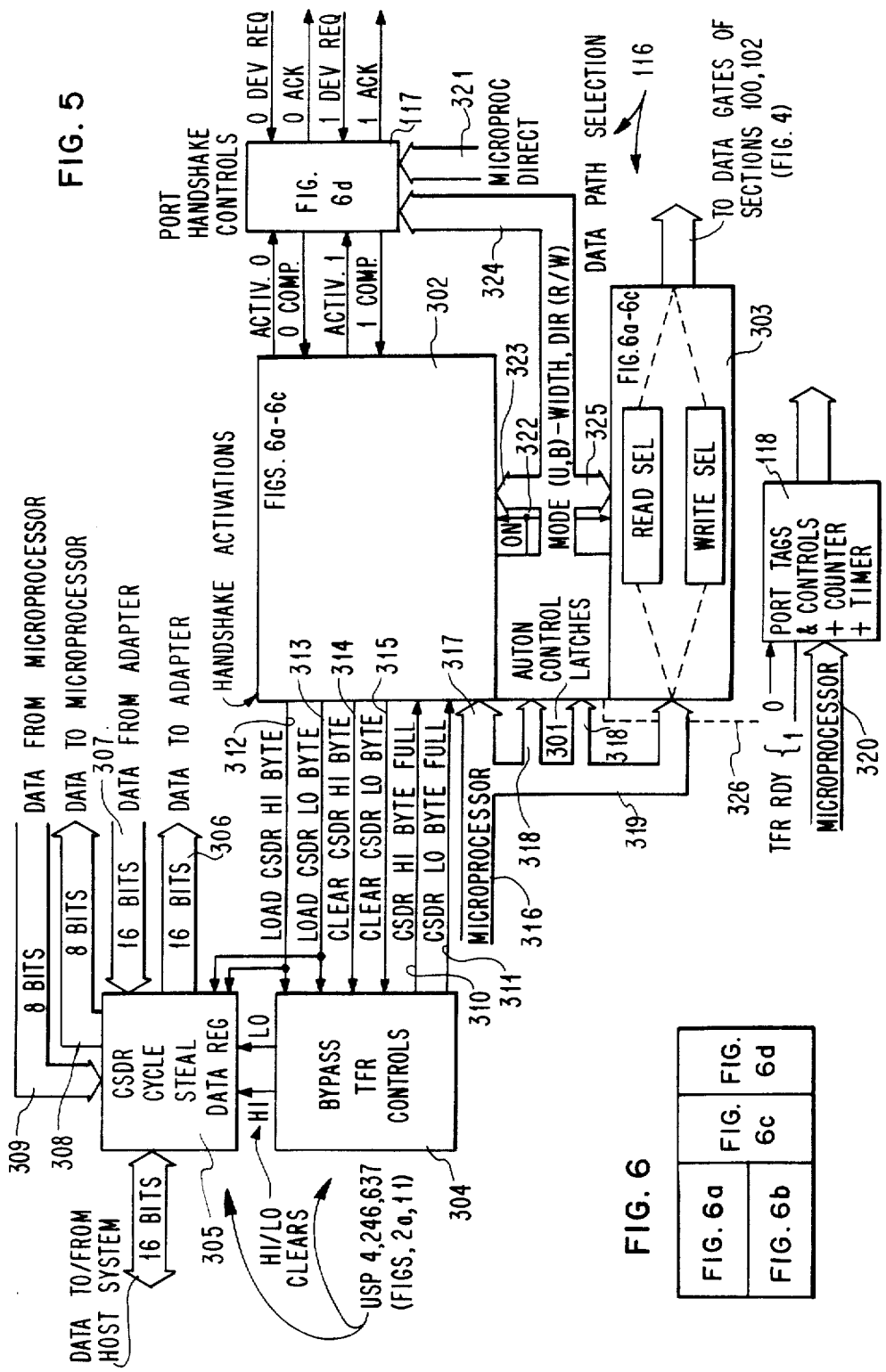

PERIPHERAL INTERFACE ADAPTER CIRCUIT FOR USE IN I/O CONTROLLER CARD HAVING MULTIPLE MODES OF OPERATION

CROSS-REFERENCES TO RELATED APPLICATIONS

Co-pending application Ser. No. 345,101 filed Feb. 2, 1982, by C. A. Heath et al—entitled "Cycle Stealing I/O Controller with Programmable Off-Line Mode of Operation"—discloses a controller microprocessing facility which can configure the subject adapter circuit variably in response to commands prepared in a host processor.

Application Ser. No. 345,129 filed Feb. 2, 1982 by L. P. Andrews et al—entitled "Peripheral Attachment Interface for I/O Controller Having Cycle Steal and Off-Line Modes" discloses a specific peripheral interface to which the subject adapter circuit is connectable.

BACKGROUND OF THE INVENTION

This invention relates generally to circuits for adapting input - output (I/O) controllers to exchange data with a variety of different peripheral devices in various bit-parallel formats.

Presently known I/O controllers are adaptable for transferring varied length data arrays between devices and storage in a host processing system in response to programmable I/O commands which define the data length and host storage space. Generally, the data is interchanged in a predetermined bit-parallel format at the interface between the controller and each device. However, it has been found that a need exists for enabling controllers to vary such formats relative to individual devices on a dynamic (i.e. time-varying) basis, and particularly under the supervision of I/O commands. The basis for this need is that certain multiplex DI/DO operations require greater controller versatility. Such operations are illustrated herein and in the copending Heath et al application previously cross-referenced.

Accordingly, an object of this invention is to provide a more versatile interface adapter for adapting dynamically to a variety of bit-parallel formats at an associated device interface. An ancillary object is to provide for such adaptation to be governable by host-programmable command functions.

Known I/O controllers contain microprocessors and adapters which are unable to vary data communication formats to permit simultaneous communication between a device and both a host processor and the controller microprocessor. It is now recognized that a need exists for providing this capability.

An object of the present invention is to provide a more versatile interface adapter which can be conditioned dynamically, under supervision of programmable I/O commands, to transfer data in various bit-parallel formats between devices and both a host processor and a microprocessor. Another object is to provide an adapter for this purpose which can operate autonomously and thereby ease traffic burdens on associated microprocessor and host processor systems.

One presently known I/O controller system contains a microprocessor and a cycle stealing bus circuit for conducting high speed data transfers relative to a host processor. In response to I/O commands prepared by the host system, the microprocessor prepares the bus circuit. Then dedicated controls take over and operate the bus circuit to transfer data between the host processor and a device in a so-called "cycle stealing" mode. This is accomplished autonomously, i.e. without further assistance from or control by the host processor or microprocessor. While the bus circuit is transferring the data the microprocessor is potentially free for performing other functions, including retrieval and interpretation of other commands. A system of this type is disclosed in U.S. Pat. No. 4,246,637 to Brown et al.

An object of the present invention is to provide a more versatile peripheral adapter circuit which can transfer data concurrently between a device and both a bus circuit of the type described in the aforementioned Brown et al patent and an associated microprocessor, whereby the device may be linked concurrently with the microprocessor and host systems, or separately with each system, and thereby sustain several unique data processing operations.

For example, in one such operation—referred to herein as "array indexing"—a section of the adapter transfers a variable number of bit-parallel "address" data terms from the microprocessor to a device while another section of the adapter concurrently transfers "addressed" portions of a data array between the foregoing bus circuit and the same device.

In another operation of this kind, "polling" or "scanning" information is presented at the peripheral interface for selecting one of a plurality of devices and data is transferred between that device and either the host processor or microprocessor. This operation is useful in multiplex process control applications—e.g. for scanning process sensors and actuating process control elements—or in telephone line scanning operations, or the like. The microprocessor may direct such operations in an off-line (secondary) processing mode, leaving the host processor free to perform other data processing functions. A system operating in this manner is disclosed in the copending application by Heath et al, cited above under "Cross References to Related Applications".

Accordingly, another object of the present invention is to provide a more versatile interface adapter circuit which is capable of communicating with more than one programmable processing system at a time—e.g. with the foregoing microprocessor and host systems—and which can be dynamically conditioned to operate in various communication modes and bit-parallel formats under the direction of programmable commands which can be scheduled by the host system and interpreted by the microprocessor.

SUMMARY OF THE INVENTION

An adapter circuit in accordance with the present invention comprises two or more separately controllable data handling sections which can be operated either asynchronously or in time coordination. Each can adapt to various bit-parallel formats and together the two can sustain various full and half duplex communication configurations relative to a device interface and one or more processing systems. These sections can be conditioned by the processing systems to operate either as discretely separate data transfer devices or effectively in parallel as a single device. When operating separately, the sections may transfer data sets which are either inter-related (e.g. addresses and addressed data) or entirely unrelated (e.g. two different data arrays).

In an embodiment described herein either section can be conditioned to communicate with a microprocessor and a cycle stealing bus of the kind described in the above mentioned U.S. Pat. No. 4,246,637 to Brown et al. The presently disclosed microprocessor differs from the microprocessor disclosed in the Brown et al patent primarily in its capabilities for conditioning the adapter and its sections for exchanging data with the host processor and microprocessor concurrently and for varying the format in which data is exchanged at the device interface. These capabilities, and the related adapter operations, provide the basis for a number of unique system operations described in this application and in the application by Heath et al cross-referenced previously.

The present adapter sections contain separate handshaking control circuits which are connectable at the peripheral interface in various external and internal configurations. The internal configurations enable the sections to operate in time coordination while conducting various data transfer operations. In one such operation the adapter sections are effectively operated in parallel to present an extended bit-parallel interface to a device during an exchange of data between that device and the host processor (via the adapter and the cycle stealing bus circuit). In another such operation the adapter sections are operated to pass separate but related data arrays to and/or from a device; e.g. for sustaining the foregoing array indexing type of operation.

Handshaking controls in a section of one adapter can be connected to handshaking controls in a section of another adapter to provide for time-coordinated data transfer operations between a device and sections of two or more adapters.

The adapter and microprocessor can be operated relative to the host processor in several distinct modes: (a) a real time mode wherein data is directly exchanged between the host processor and a device; (b) an offline mode wherein the microprocessor operates as a secondary processing system to process data supplied to the microprocessor either by a device or the host system; or (c) a duplex mode wherein data is passed concurrently between a device and both the host processor and microprocessor.

For sustaining these modes the adapter requires autonomous controls (i.e. controls operating independent of the microprocessor and exclusively serving the adapter) which are configurable to link a device for data transfer to either the host processor, the microprocessor or both at the same time. Furthermore, the present adapter is configurable to exchange data at the device interface in various bit-parallel formats, in the disclosed embodiment formats of 8, 16 or 32 bits.

By virtue of its sectional configuration, the adapter can interact concurrently with the microprocessor and cycle stealing bus circuits, and its sections can handle either separate data exchanges (in parallel units of 8 or 16 bits) or joint parallel exchanges (in units of 32 bits). The exchanged data may be transferred between the device and either the microprocessor or the cycle stealing bus circuit or both (e.g. to conduct different data transfers relative to stores in the host system and/or microprocessor or to conduct an array indexing operation as noted previously).

Each section of the subject adapter circuit contains an integral set of handshaking controls for receiving request signals and transferring acknowledgment signals. The acknowledgment sending controls of one section can be connected either to the device interface or to the request receiving controls of the other section. The request receiving controls of one section and the acknowledgment sending controls of the other section are connectable either to the device interface or to acknowledgment sending and request receiving controls in other adapters. In the last mentioned configuration, sections of two or more controller adapters, linked via their handshaking circuits, can perform coordinated data transfer operations relative to a device and one or more host processors which could not be performed by a single controller.

An I/O controller containing a subject adapter circuit and an associated microprocessor and cycle stealing bus circuit may be integrally packaged on a single multi-chip LSI card and assigned a unique device address relative to the host processor. This makes such I/O controllers especially useful as modular or standardized elements, for connecting host processors and devices in a variety of time-changing or static configurations. The configurable adapter allows the microprocessor to offload many different types of operations from the host processor at a cost which is very modest when compared to the host software overhead which is eliminated. A number of such configurations are described herein as novel applications of the subject adapter circuit.

For a more complete understanding of the invention and a comprehension of other advantages and features thereof, reference should be made to the following description taken in connection with the accompanying drawings, and to the appended claims which indicate the scope of the invention.

BRIEF DESCRIPTION OF THE DRAWINGS

FIG. 4 schematically illustrates register and transfer gating circuits within the subject adapter for moving data between peripheral interface ports and the microprocessor and/or cycle stealing bus in various bit-parallel formats.

FIGS. 5–8 schematically illustrate details and exemplary action sequences of control circuits shown in FIG. 4.

DETAILED DESCRIPTION OF THE ILLUSTRATED EMBODIMENT

Figure 1:
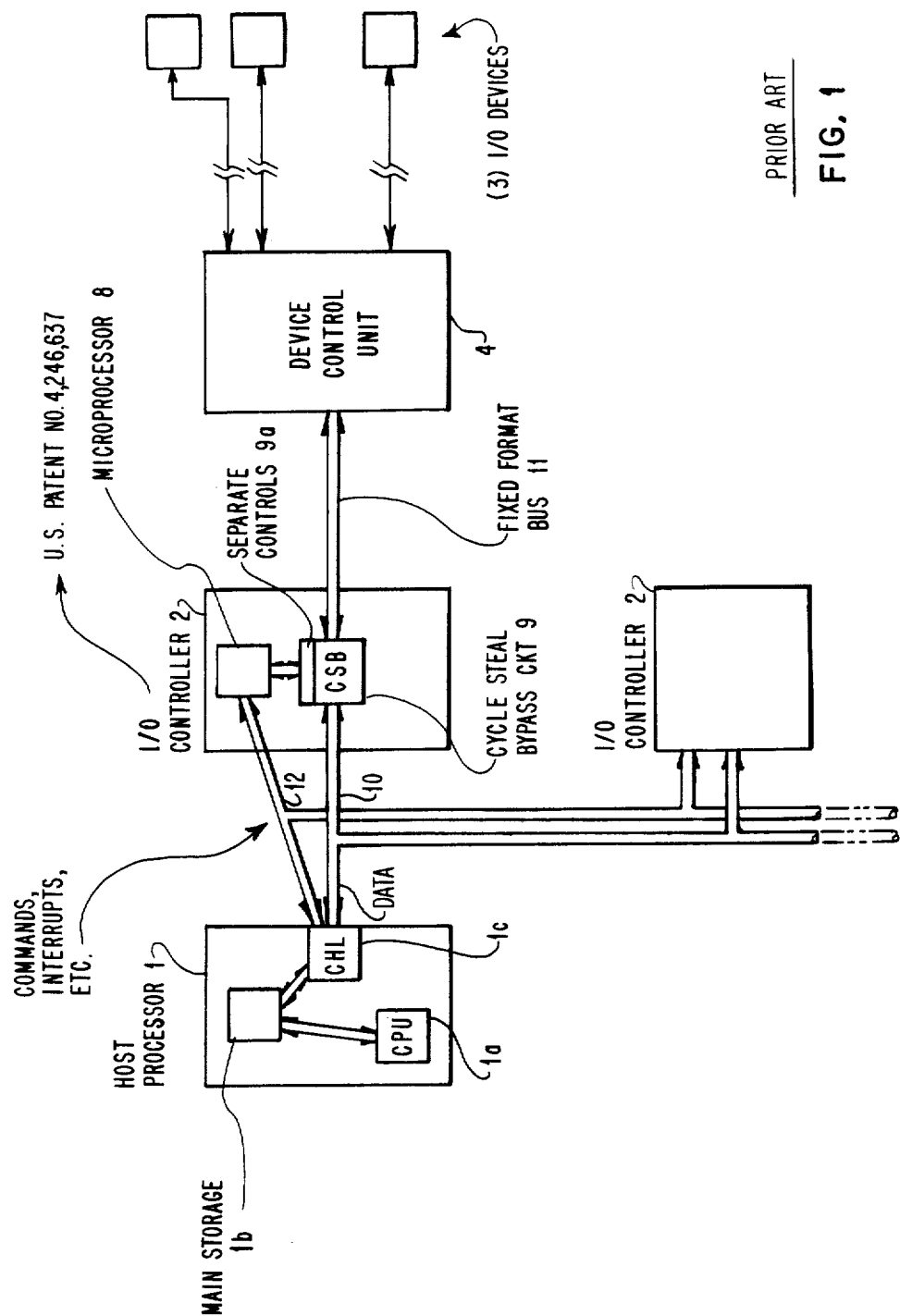
FIG. 1 schematically illustrates a prior art I/O controller containing a microprocessor and a cycle stealing bus circuit for conducting variable length high speed data transfers relative to a host processor.

FIG. 1 shows a known and more or less representative environmental data processing system in which the adapter of the present invention may be used. This system contains a host processor 1, and one or more I/O controllers 2, each of the latter linked to a collection of one or more I/O devices 3. The devices may connect to respective controllers via one or more device control units 4.

A typical host system 1 contains a CPU 1a, a main memory 1b and one or more I/O channels 1c. The controllers 2 link to the I/O channels for transferring data between memory 1b and devices 3.

Each controller 2 contains a microprocessor 8 and a self-sequencing (autonomous) cycle steal (bypass) busing circuit 9 (CSB). Microprocessor 8 and CSB 9 have divided responsibilities for transferring data between host system 1 and devices 3. The microprocessor interprets commands supplied by the host processor via bus 10 and CSB, and prepares dedicated controls 9a in CSB. Controls 9a then operate CSB in an autonomous manner (i.e. independent of the microprocessor) to transfer data between host system bus 10 and peripheral bus 11 in a predetermined format. The microprocessor and host also exchange initiating control information, status information and other control information via control bus 12.

A representative system of this type is fully described in U.S. Pat. No. 4,246,637 by Brown et al, the disclosure of said patent being incorporated herein by this reference to the extent that it may be presently relevant. The microprocessor described in said patent requires certain adaptations described herein for communicating effectively with the subject peripheral interface adapter.

Figure 2:
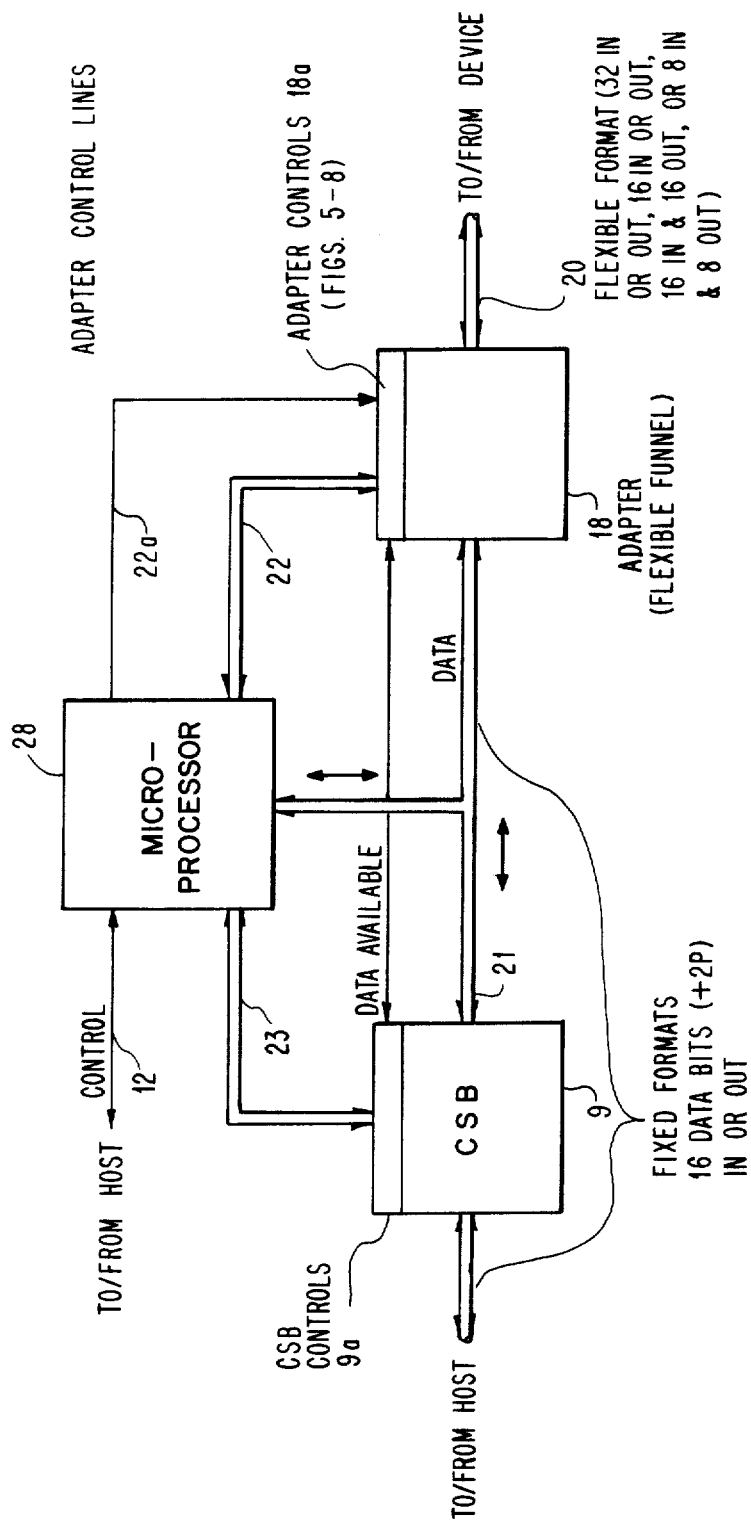
FIG. 2 is a schematic block diagram of an I/O controller, an autonomously controlled peripheral interface adapter mechanism in accordance with the present invention and a prior art microprocessor and cycle stealing bus configurable to exchange data with a device in various communication configurations and bit-parallel forms.

FIG. 2 indicates, in a general context, the manner in which a peripheral interface adapter 18 in accordance with the present invention is incorporated into a system like that shown in FIG. 1. Adapter 18—also termed "flexible funnel"—is dynamically configurable to link peripheral interface bus 20 selectively with CSB or microprocessor 28, or both concurrently, and to transfer data through such links with various bit-width formats and various communication protocols. In response to programmable commands interpreted by the microprocessor—the microprocessor retrieving such commands from host memory 1b via CSB and data bus 21—adapter controls 18a and CSB controls 9a can be conditioned via respective control buses 22, 22a and 23 to transfer variable length data arrays autonomously between a device and either the host system, the microprocessor or both simultaneously.

Figure 3:
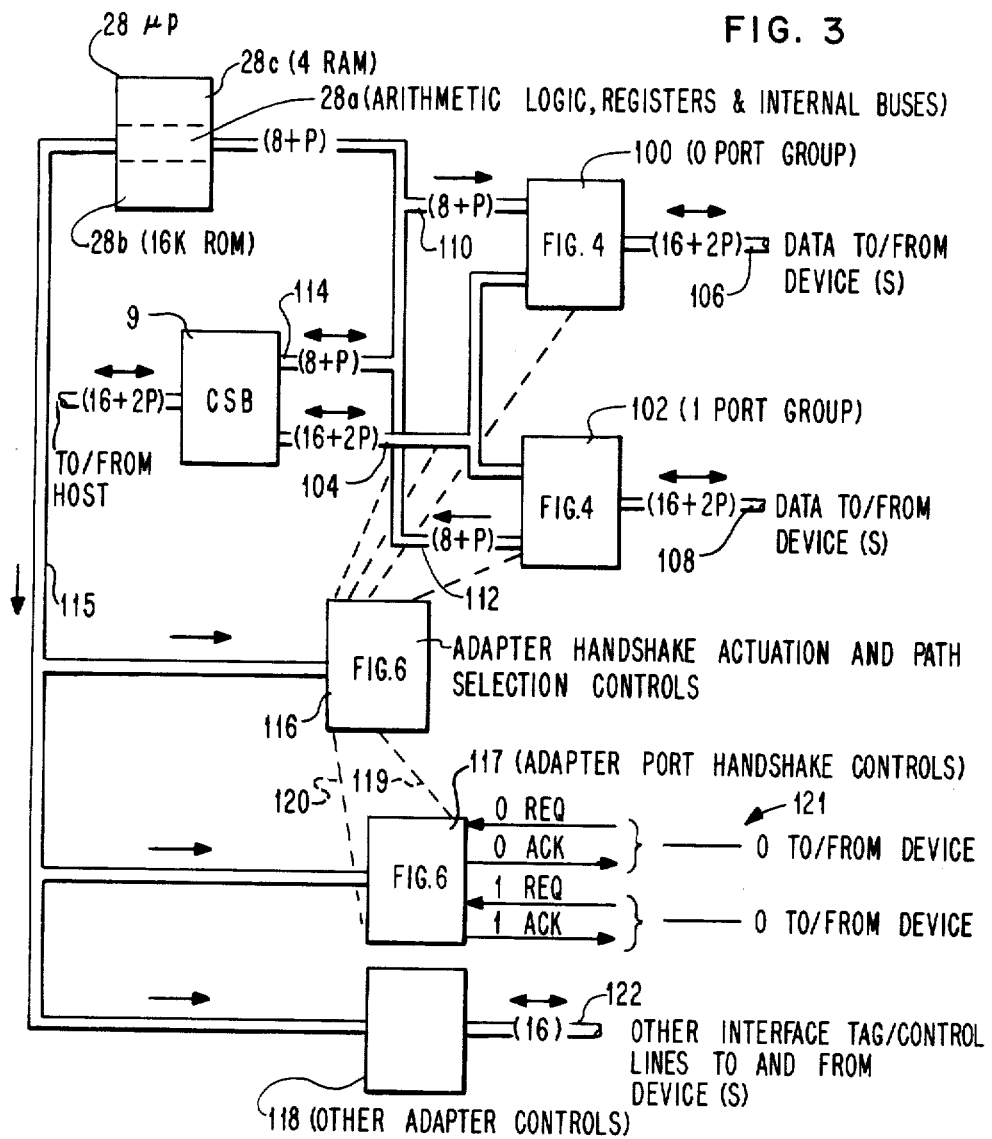
FIG. 3 is a schematic block diagram of a subject peripheral interface adapter circuit, indicating details of its connection to associated device interface, microprocessor, and cycle stealing bus circuit ports.

Logical organizations of adapter 18 and microprocessor 28, for setting up and sustaining these data transfer operations, are suggested in FIG. 3. The microprocessor contains an arithmetic logic unit (ALU) 28a, controlled by programs of instructions contained in a read only memory (ROM) 28b and random access memory (RAM) 28c. In response to such programs the ALU processes data stored in the RAM. The capacities of these memories and the internal busing width of ALU 28 determine the performance of the microprocessor and thereby indirectly affect the productivity of the subject adapter, in respect to the time required to initiate its "high speed" operations relative to CSB. However, these parameters are otherwise not relevant to the present invention.

A microprocessor readily adaptable for these purposes would be the Intel ® 8085A microprocessor described in "MCS-8085 Family Users Manual", copyright 1979 by Intel ® Corporation. This processor contains a RAM, a ROM, an ALU, an array of nine addressable registers (six 8-bit registers and three 16-bit registers), an 8-bit internal data bus, a 16-bit internal memory addressing bus, I/O ports tied to its 8-bit bus and timing controls. Its RAM and ROM memories share a common 16-bit address bus and are organized in addressable 8-bit byte locations. Their aggregate capacity cannot exceed 64K bytes (K = 1024), the capacity afforded by the shared address bus.

In the "native" instruction set (instructions directly interpretable as "object code" at the "machine" level and not requiring intermediate treatment by assembler programs), instructions are represented in one, two and three byte expressions described in the foregoing Family Users Manual. Usage of these microprocessors with assembly languages and assembler programs is described in "8080/8085 Assembly Language Programming" copyright 1977, 1978, 1979 by Intel Corporation. Such usage has no direct relevance to the present invention but does have ancillary relevance to "Programmable Offline Mode" procedures described in the cross-referenced copending application by Heath et al for utilizing the subject adapter in a number of unusual applications. Although such procedures are not considered relevant presently, the disclosure of the copending Heath et al application is incorporated herein, by this reference, to the extent that it may have ancillary relevance.

With continued reference to FIG. 3, adapter 18 contains two discrete "port" sections 100 and 102. Each section can exchange data with CSB via respective 16-bit parts of a 32-bit data bus 104. In the presently disclosed embodiment such exchanges are always conducted in bit-parallel units of 16 bits. Sections 100 and 102 have respective "∅" and "1" peripheral ports connecting with devices via respective 16-bit buses 106 and 108. The adapter can operate these ports to exchange data with devices in various bit-parallel formats of 8, 16 or 32 bits.

Sections 100 and 102 also connect with microprocessor 28 via respective buses 110 and 112 for exchanging data 8-bits (1-byte) at a time. Data bytes are transferred directly from the microprocessor to the adapter via bus 110 and from the adapter to the microprocessor via bus 112. Bus 114 transfers data from the microprocessor to bus circuit 9 enabling the microprocessor to transfer data indirectly relative to the adapter in 16-bit or 32-bit parallel units (via not-shown latches in CSB). The microprocessor can operate through the adapter data paths in a step-by-step (non-autonomous) mode to transfer 16 or 32 bits of data, 8 bits at a time, between the microprocessor and CSB, and then stimulate CSB and the adapter to pass the data to a device in 16 or 32 bit units.

Control bus 115 links the microprocessor to sequence controls 116, handshake controls 117 and other peripheral interface controls 118. Controls 116 constitute a multi-state sequencer which may step autonomously through a selective sequence of states after being variously pre-conditioned by the microprocessor. Controls 117 and 118 can be stimulated by the sequencer 116 via control links 119 and 120 and by the microprocessor to respectively conduct handshake signalling and other control signalling operations relative to respective sets of control lines 121 and 122 at the peripheral device interface. Controls 116–118 may be operated either "autonomously" by controls 116 or directly (step-by-step) by microprocessor 28.

Details of adapter data conversion sections 100 and 102 are discussed below with reference to FIG. 4, and presently relevant details of controls 116–118 are discussed below with reference to FIGS. 5–8. Other aspects of circuits 117 and 118 are described in the copending patent application by Andrews et al cited above under "Cross References To Related Applications". Although these other aspects are not considered relevant presently, the description of that application is incorporated herein by this reference to the extent that it may have ancillary relevance for understanding some subtle applications made possible by the subject flexible funnel circuit. Presently relevant details of the interface control circuits 117 and 118 relate only to operations of funnel adapter sections 100 and 102. Non-relevant details relate to other handshaking and interface signalling operations which relate only in an ancillary sense to the operations of sections 100, 102 but are not essential for useful operation of said sections.

Referring to FIG. 4, Ø and 1 (upper and lower) each of the port sections 100 and 102 contains three 8-bit data transfer registers. Section 100 contains registers 140, 141 and 142, and section 102 contains registers 143, 144 and 145. Registers 140 and 141 in the upper section have gated output connections to respective 8-bit parallel data busing ports 150 and 151 at the peripheral interface. These ports are labeled ØHI and ØLO, respectively. Registers 143 and 144 have gated output connections to respective 8-bit parallel data busing ports 152 and 153 (1HI and 1LO) at the peripheral interface. Banks of gates for transferring data bytes from registers 140, 141, 143 and 144 to respective ports 150-153 are represented respectively at 154-157.

Buses 160-163, between ports 150-153 and respective registers are bidirectional. Data can be transferred 8 bits at a time from the register to respective ports through respective banks of output gates (154-157) and from the ports to the respective registers through respective input gate banks 164-167. Port 152 also has an entry gating path to register 144 via gate bank 168.

Bus 170 and input gates 171 and 173 permit data to be transferred in 8-bit units from CSB selectively into register 140 (via 171) or register 143 (via 172). Bus 173 and gates 174 and 175 permit data bytes to be transferred from CSB selectively into register 141 (via 174) or register 144 (via 175).

Bus 176 and gates 177 and 178 permit data to be transferred byte serially from microprocessor 28 either into register 141 (via gates 177) or CSB (via gates 178).

Register 142 can receive data bytes from register 140, CSB or register 143 via respective gated input paths 180, 181 and 182. Register 145 can receive data from register 142, register 141 or register 144 via respective gating paths 183, 184 and 185.

Data bytes can be passed from registers 142 and 145 to CSB via respective gated paths 186 and branch 188 of bus 187. Data is transferrable from register 145 to the microprocessor via branch 189 of bus 187.

Register 140 can receive data bytes from register 141 via gates 190. Register 143 has an unused entry path 191.

In the presently described embodiment gates associated with registers 140-145 are operated selectively, under control of sequencer 116 (FIGS. 3, 5, 6) to transfer data in bit-parallel units of 8, 16 or 32 bits between ports 150-153 and the registers, in units of 16-bits between the registers and CSB, and in 8-bit units between certain registers and microprocessor 28. This is particularly useful because many microprocessors have 8-bit busing structures and many larger processors useful as host systems—e.g. the IBM Series/1—have 16-bit busing structures.

Since CSB and the adapter have a 16-bit wide interface and can operate autonomously, under respective dedicated controls, they may cooperatively transfer data records of variable length between the host and a device at higher speeds than would be possible if the microprocessor had to participate in each byte transfer. Furthermore, since the autonomous controls of the adapter can be conditioned dynamically (by the host and microprocessor) to accommodate device formats of 8, 16 or 32 bits, CSB and the adapter can interact with considerable versatility. The autonomous adapter format is programmable via programs of chainable commands, or device control block (DCB) arrays, which can be scheduled for execution in orderly fashion by host supervisory software. Since CSB links bidirectionally to microprocessor 28—for receiving data bytes via path 176, 178 and sending data bytes via path 181, 142, 183, 145, 187, 189—CSB can be operated autonomously to transfer commands and arbitrary length data sets between memories in the host and microprocessor systems (16 bits at a time at the host interface, 8 at a time at the microprocessor interface).

In operation, microprocessor 28 interprets commands defined in DCB arrays retrieved from host processor 1 and in response to certain "high speed" commands sets up CSB and sequencer 116 (FIG. 3) to conduct high speed transfers of data sets having various specific byte lengths on an autonomous basis. The conditioning of sequencer 116 permits it to conduct such transfers in various bit-parallel device interface formats (8, 16 or 32 bits). In these autonomous mode operations gates between ports 150-153 and adapter registers 140, 141, 143 and 144 are operated to transfer data to or from a device in bit-parallel formats of 8, 16 or 32 bits, and gates between these registers and CSB and registers 142 and 145 are operated to pass the same data from or to host processor 1 via CSB in a 16-bit format.

The microprocessor can also operate under control of DCB's and other command functions to control the adapter in a non-autonomous (step-by-step) mode to transfer data between the microprocessor and a device (8-bits at a time). The microprocessor also can operate in this manner to repeatedly condition CSB, the adapter and device to conduct single 8, 16 or 32 bit transfers.

In order to provide a significantly useful variety of autonomous mode operations without excessively complicated or error-prone adapter controls, the present embodiment is operated in only eight presently described modes. However, those skilled in the art will easily perceive other modes which could have been implemented without further exercise of invention.

These presently used autonomous modes are labeled: unidirectional 8-bit Write (abbreviated U/8 W), unidirectional 16-bit Write (abbreviated U/16 W), unidirectional 8-bit Read (U/8 R), unidirectional 16-bit Read (U/16 R), bidirectional 16-bit Write (B/16 W), bidirectional 16-bit Read (B/16 R), bidirectional 32-bit Write (B/32 W) and bidirectional 32-bit Read (B/32 R). The operations autonomously performed by the adapter and its dedicated controls in these modes are summarized in the following table:

| AUTONOMOUS (HIGH SPEED) OPERATION: | |
|---|---|
| Mode | Adapter Operation (Refer to FIG. 4) |
| U/8W* | Receive data 16 bits at a time from CSB in regs 140, 141; connect 141 to 140 (in tandem); transfer 8 bits at a |

| -continued | |
|---|---|
| AUTONOMOUS (HIGH SPEED) OPERATION: | |
| Mode | Adapter Operation (Refer to FIG. 4) |
| | time from 140 to device via HI port 150 only. |
| U/8R* | Receive 8 bits at a time from device via 1 HI, port 152, alternately in regs 143 & 144; transfer 16 bits at a time to CSB via parallel paths from 143 and 144 through regs 142 & 145. |
| U/16W* | Receive 16 bits at a time from CSB in 140, 141; transfer 16 bits at a time to device via parallel paths thru Ø ports 150 and 151. |
| U/16R* | Receive 16 bits at a time from device in regs 143 & 144, via ports 1 HI and 1 LO; then proceed same as for U/8R. |

*With handshake connections to other adapters modes U/8W, U/8R, U/16W, U/16R can be used to sustain coordinated transfers of 24 bits, 40 bits, 48 bits (or more) at a time relative to a device.

| | |
|---|---|
| B/16W* | Receive 16 bits at a time from CSB in regs 143, 144 & transfer in parallel to ports 1 HI, 1 LO** |
| B/16R* | Receive 16 bits at a time from device via ports 1 HI, LO & regs 143, 144 & transfer to CSB in parallel via regs 142, 145** |
| B/32W* | Receive 16 bits at a time from CSB, alternately in regs 140, 141 & regs 143, 144 and transfer 32 bits at a time in parallel from all four regs to device via all four ports |
| B/32R* | Receive 32 bits at a time from device, alternately in regs 140, 141 and 143, 144, and transfer 16 bits at a time to CSB, alternately between parallel paths from 140, 141 thru 145 and 143, 144 thru 142, 145 |

NOTES:
*With handshake connections to other adapters, modes B/16 and B/32 can be used to sustain coordinated transfers of 48 or 64 (or more) data bits at a time relative to a device.
**During B/16 mode operations, microprocessor may synchronously operate through port Ø and registers 140, 141 to present array addresses used by the device to select sources/destinations for individual 16-bit data terms in a positionally ordered data array.

The individual stages of registers 140-145 are preferably implemented by means of well-known polarity hold latch circuits designed to provide continuous passage of data between respective inputs and outputs when their clocking (gating) inputs are held continuously active. Consequently, these registers may be used either as storage latches or gating elements between CSB and the device ports. The potential time-saving advantages in respect to the foregoing autonomous mode operations may be understood by considering the following examples.

In the 16-bit unidirectional Write mode (U/16W) clocking inputs of registers 140 and 141, and associated path gates, are operated so as to provide a virtually continuous 16-bit wide signal conduction path from CSB to ports 150 and 151. The same action is provided between CSB and ports 152 and 153 in the 16-bit bidirectional Write mode (B/16W). Consequently, each 16-bit unit of data presented by CSB in these modes is passed instantly to respective device interface ports (ignoring path conduction delays) for potentially immediate presentation to the device.

In the 16-bit unidirectional and bidirectional Read modes (U/16R and B/16R) clocking inputs of registers 142-145 and associated path gates are operated to provide the same continuous 16-bit parallel signal conduction effect in the reverse direction from ports 152 and 153 to CSB. Data presented at port 152 in this mode passes serially through registers 143 and 142 to CSB, without any clocking delays, and data presented at port 153 passes serially through registers 144 and 145 to CSB without delay.

In the 8-bit unidirectional Write mode (U/8W) each 16-bit data group ("word") at the CSB interface passes to port 150 in two stages, without any discrete latching of data in register 141. The first data byte passes from CSB to 150 directly through register 140, and the second byte is passed from CSB to 150 via registers 141 and 140. The second data byte thereby flows from CSB to port 150 (without a discrete latching "stopover" in register 141). This action affords a basis for conserving and simplifying the logic in autonomous sequencer 116 as explained later.

In 32-bit bidirectional operations 16, data bits are latched in adapter registers while the other 16-bits are being fetched or transferred. In 32-bit Write operations (B/32W) each 16-bit data word presented by CSB is applied alternately to register pair 140,141 and register pair 143,144. The word applied to register pair 140,141 is latched in that pair and held while the next word is presented and gated through register pair 143,144. Accordingly, the latched term in pair 140,141 and the term gated through 143,144 appear immediately at ports 150-153 as a 32-bit parallel group.

The 16-bit unidirectional modes can be used by the microprocessor—in an offline processing mode described in the cross-referenced application by Heath et al—to sustain Read and Write operations for effectively providing a full duplex data communication link between the host system and a single addressed device with minimal burdening of host supervisory software. In such operations the microprocessor, after initiation by a host DCB, interprets sub-commands contained in a secondary command list specified by the DCB. These sub-commands variously define 16-bit Write and Read data transfers relative to separate data spaces in the host system and device. For each Write transfer the microprocessor prepares CSB and the device, sets the autonomous sequencer 116 to mode U/16W and activates the sequencer to complete the transfer (from CSB to port Ø). For each read transfer the microprocessor follows the same procedure but sets mode U/16R to cause data to pass from the device to CSB via port 1. The individual Read and Write transfers cannot be carried out simultaneously but they can be interleaved and, by suitable programming of the microprocessor, can be made to present minimal contention relative to resources of the device, microprocessor and host systems.

The 16-bit high speed bidirectional operations B/16W and B/16R, which operate only through port 1, can be coordinated with array addressing operations directed by the microprocessor through port Ø for implementing the previously mentioned array indexing mode of operation. In this mode, port handshaking functions associated with the data transfer activities at port 1 may be coordinated with port Ø handshakes and requisite microprocessor operations.

Figure 6A:
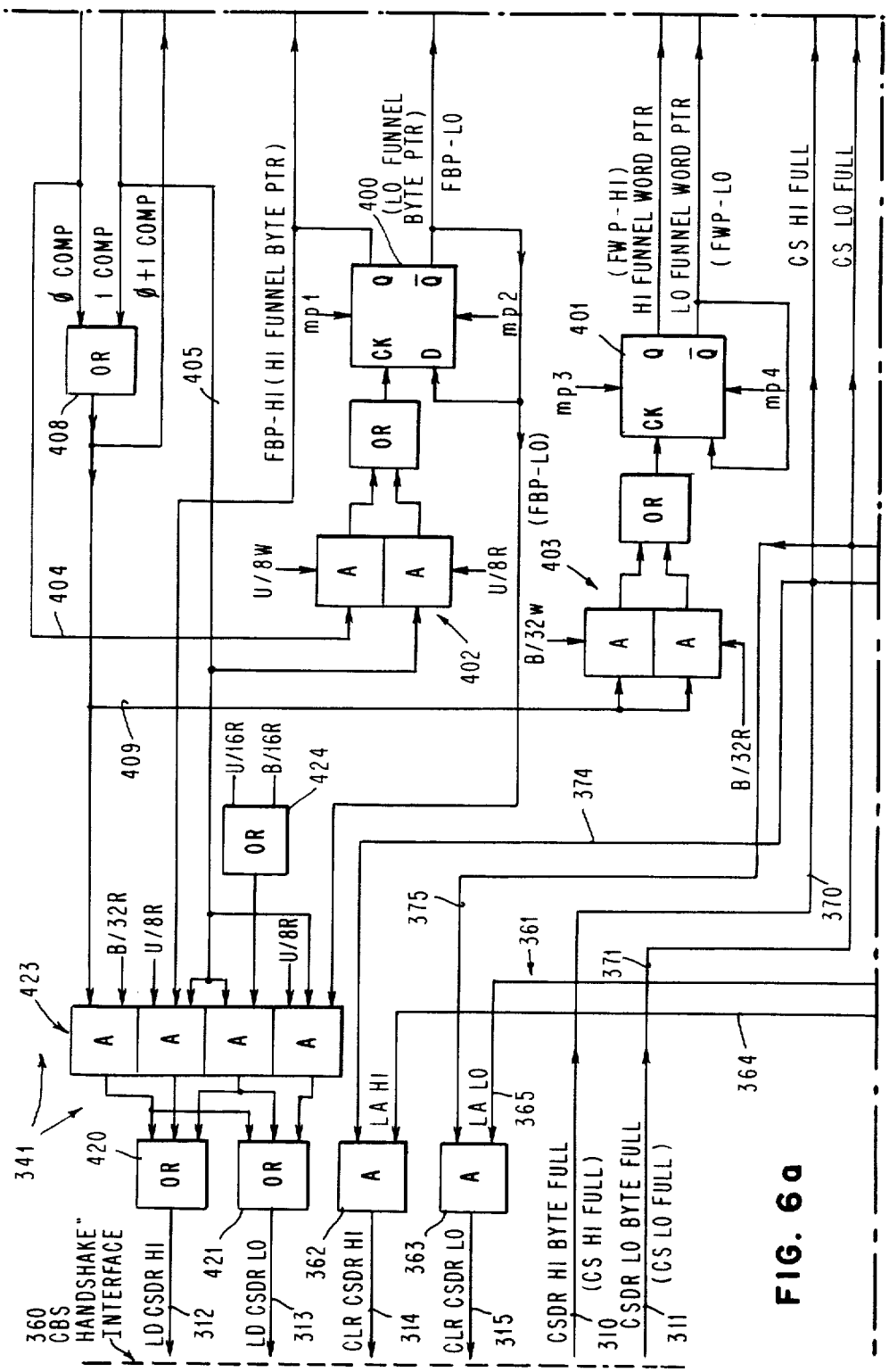
Figure 6B:
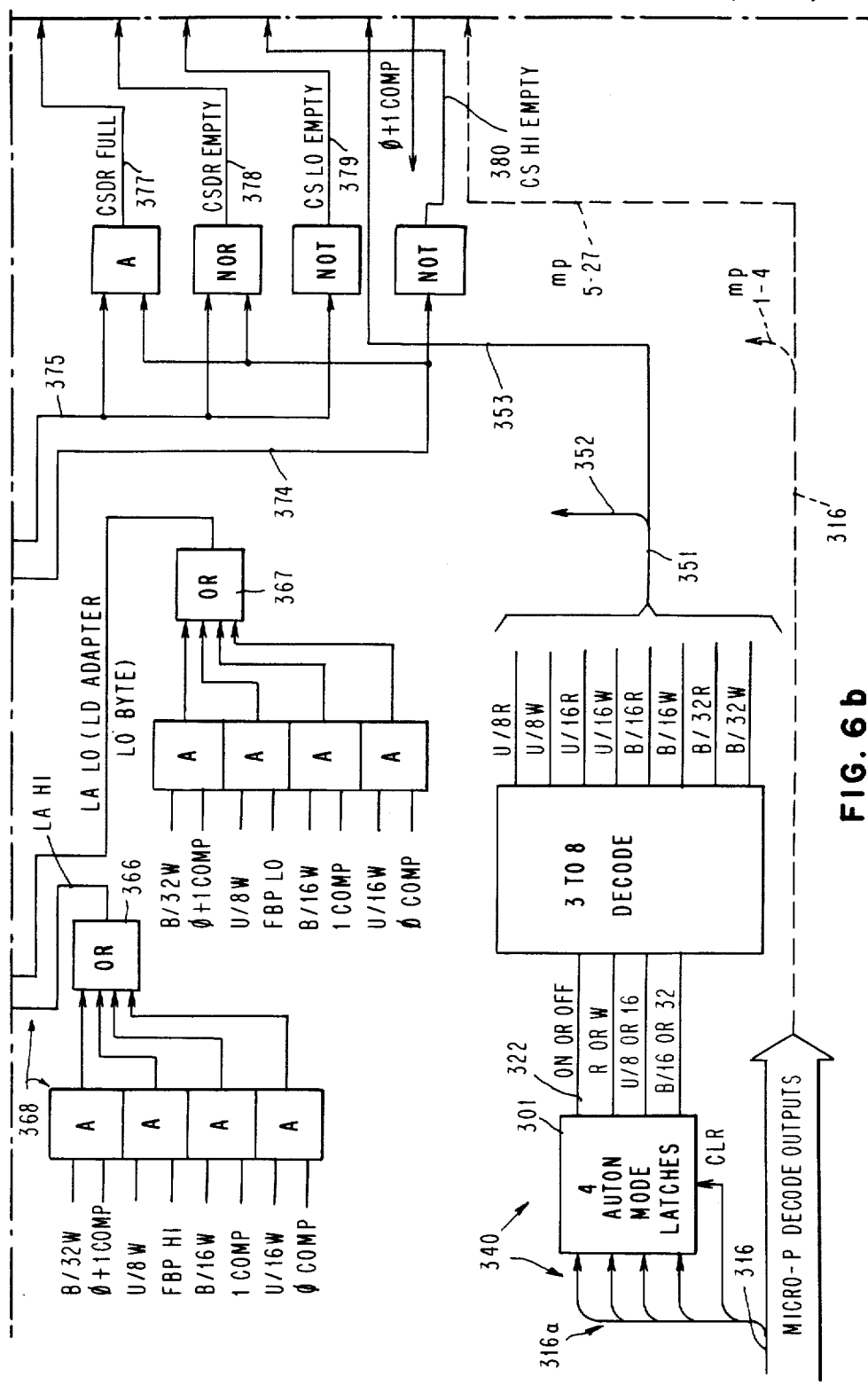
Figure 6C:
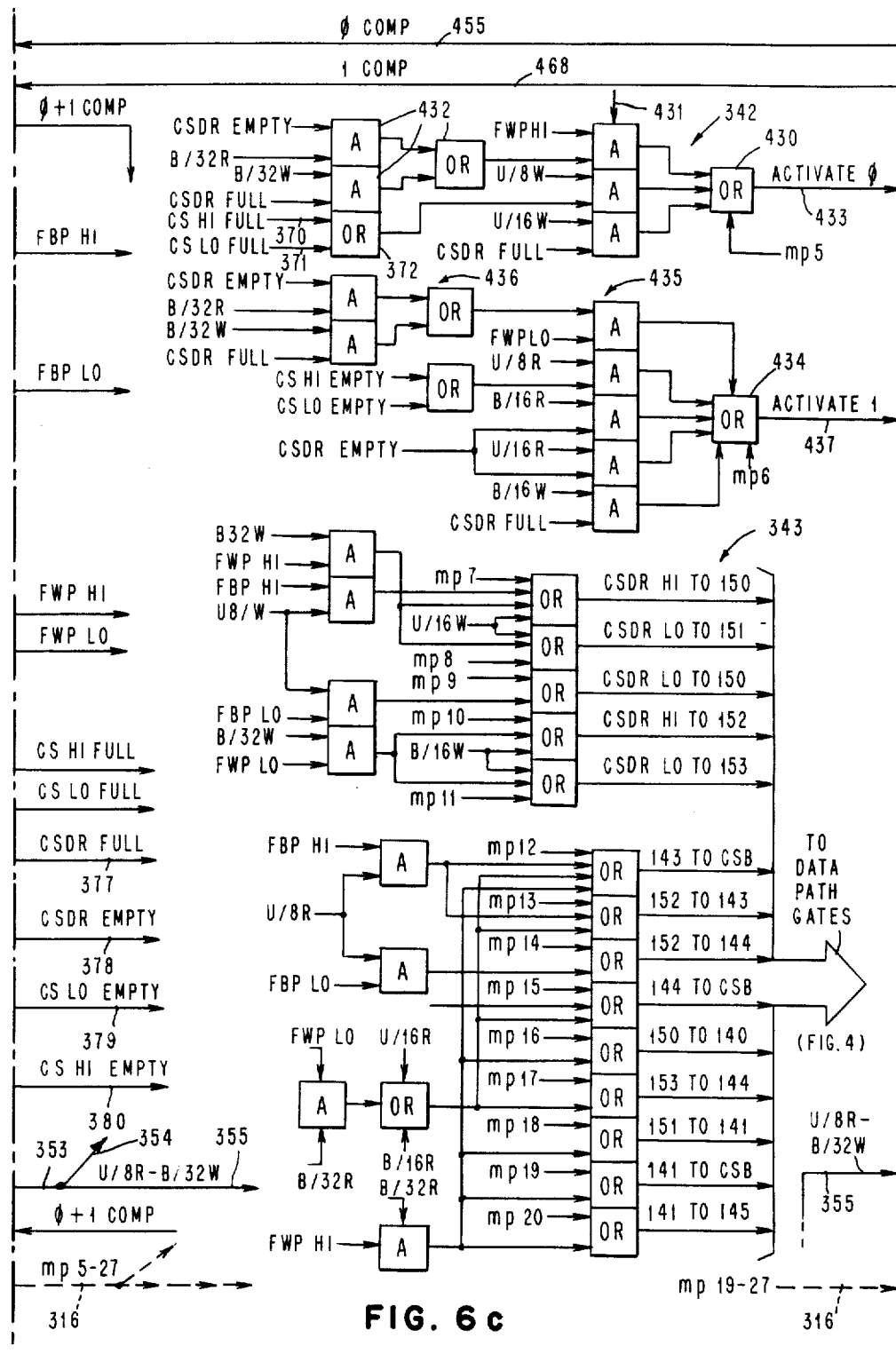

The controls 116, 117 are described next with reference to FIGS. 5, 6a, 6b and 6c. FIGS. 6a-6c constitute a single connected circuit diagram arranged as shown in FIG. 6.

Referring first to FIG. 5, the controls 116 comprise autonomous control latches 301, handshake activation controls 302 and data path gating controls 303. Details of these circuits are contained in FIGS. 6a and 6b. The adapter controls further comprise port handshake controls 117 and the other interface controls 118 corresponding to elements 117 and 118 in FIG. 3. Details of controls 117 are contained in FIG. 6c. Details of controls 118, which are not considered relevant to the present invention, are contained in the cross-referenced Andrews et al application.

Figure 11:
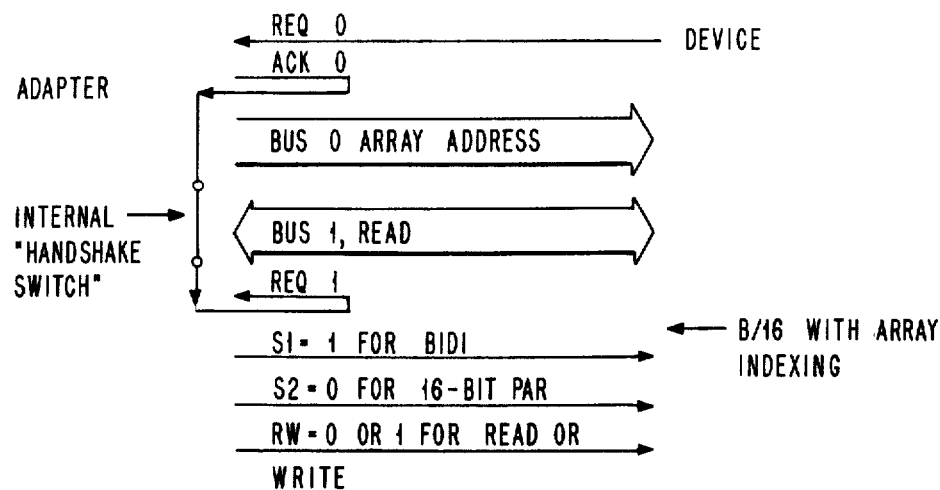

The handshake activation controls 302 interface with bypass transfer controls 304 in the CSB subsystem. The data registers of the adapter interface with a cycle steal data register (CSDR) 305 in the CSB system. The bypass transfer controls 304 and register 305 are shown in FIG. 2a of U.S. Pat. No. 4,246,637 to Brown et al and details of the transfer controls 304 are shown in FIG. 11 of that patent. Accordingly, such details will not be discussed further in this disclosure since this patent is incorporated herein by reference.

"Write" data busing lines shown at 306 correspond to buses 170 and 173 in FIG. 4. "Read" busing lines at 307 correspond to buses 186 and 188 in FIG. 4. Data busing lines 308 correspond to bus 181 in FIG. 4 and input data bus 309 corresponds to bus 178 of FIG. 4. Register 305 contains high byte and low byte portions which together present 16-bits in parallel to the adapter or receive 16-bits in parallel from the adapter. These portions of the register are not specifically indicated in FIG. 5. However, associated with these high and low portions are respective high and low full indicator lines, shown at 310 and 311, respectively, which indicate to the handshake activation controls 302 the state of readiness of the CSB subsystem to transfer or receive data bytes.

Other handshake lines 312-315 control movement of data between the adapter and CSB. Lines 312 and 313 are used during Read operations to signal the availability of data in the adapter for transfer respectively to the high and low portions of register 305. These lines are appropriately labeled "LOAD CSDR HI BYTE" and "LOAD CSDR LO BYTE". Lines 314 and 315 are used in association with Write operations to clear the high and low portions of register 305 after transfers of data to the adapter. These lines are appropriately labeled "CLEAR CSDR HI BYTE" and "CLEAR CSDR LO BYTE".

In addition to the data busing lines 308 and 309, the microprocessor has control information busing connections to the adapter shown at 316. Bus 316 has a branch 317 terminating at handshake activation controls 302, a branch 318 terminating at inputs to the autonomous control latches 301, a branch 319 terminating at the data path selection controls 303, a branch 320 terminating at the other interface controls 118, and a branch 321 terminating at the port handshake controls 117. The specific destinations of signals provided through these various branches and their functions will be described in detail with reference to FIGS. 6a-6c.

The autonomous control latches 301 include an on/-off latch having an output indicated at 322. This latch distinguishes between autonomous and non-autonomous control modes. In the autonomous mode signals provided by other autonomous control latches on buses 323-325 and on line 326 determine operating states of controls 302, 303, 117 and 118. In non-autonomous mode, the controls 302, 303, 117 and 118 are controllable by the microprocessor via its buses 316-321, to perform operations under direct microprogram control.

In operation the microprocessor initially sets the autonomous control latches to the off (non-autonomous) state and under direct control operates the adapter controls to perform device selection and status communication operations relative to the device interface. If the microprocessor wants to perform a slow speed data transfer between the memory of the microprocessor and a device, it has two options for carrying out the data transfer. It can directly operate the adapter gates (FIG. 4) in the non-autonomous mode to move data bytes between the microprocessor and ports 150 and 152 (FIG. 4) or it can prepare the device for each 8-bit transfer, then turn on the autonomous state latch and set an appropriate mode state (U/8W or U/8R) until an indication is received by the microprocessor that the 8-byte transfer has been completed by those controls. The microprocessor can also leave the autonomous latches 301 in a selected mode state to permit a stream of data bytes of arbitrary length to pass between the microprocessor and the device while the adapter is autonomously controlled, and the microprocessor can exercise direct control over terminating the operation by examining conditions presented at control interface 118.

If the microprocessor wants to set up a high speed data transfer between the CSB subsystem and a device, it conditions the autonomous controls to the On state, and an appropriate format mode, and thereafter proceeds to conduct other operations while CSB and the device exchange data under autonomous adapter control. In this mode the microprocessor is alerted to the conclusion of the operation either by a not-shown signaling connection from CSB indicating the last byte transfer (byte count equals zero) or a not-shown connection to the control interface 118 indicating a device or timing condition requiring termination of the operation. The microprocessor may also intermittently interrogate the device through interface 118 during the data transfer operation if required. As explained previously, in these autonomous mode operations the CSB substem and the device may be made to exchange a variable length data record having a length defined by a high speed command interpreted by the microprocessor or they may be made to effect discrete transfers of 8, 16 or 32-bits in association with a secondary command interpreted by the microprocessor in the programmable off-line mode mentioned previously.

FIGS. 6a-6d, arranged as shown in FIG. 6, illustrate relevant portions of the subject adapter controls. The autonomous mode controls and associated microprocessor inputs are generally indicated at 340 in FIG. 6b. Adapter controls for exchanging "handshaking" information with CSB are indicated generally at 341 in FIG. 6a. Adapter controls for activating device port handshaking functions are indicated generally at 342 in FIG. 6c. Adapter controls for enabling data gating circuits associated with registers 340-345 in FIG. 4 are generally indicated at 343 in FIG. 6c. Finally, adapter controls for directing device port handshaking functions are shown generally at 344 in FIG. 6d (these controls corresponding to the controls labeled 117 in FIG. 3).

As shown in FIG. 6b, the autonomous controls 340 comprise the autonomous mode latches 301, shown previously in FIG. 5, and decoding circuits 350 having eight outputs 350a indicating the eight autonomous modes U/8R-B/32-W. The autonomous mode latches are set and cleared by signals from the microprocessor decoder outputs indicated generally at 316a. One of these lines sets the on/off. When set to the On state—i.e. with line 322 active—the on/off latch enables decoding circuits 350 to activate one of the eight 350a as a function of the inputs received from the three remaining mode latches. One of these three inputs distinguishes between Read and Write operations (R or W), and the and Write operations (R or W), and the other two inputs select between unidirectional 8 and 16-bit operations, and bidirectional 16 and 32-bit operations. Accordingly, if the microprocessor sets the On/Off latch to the On condition and establishes the R, and the U/8 conditions, the uppermost line 350a (labeled U/8R) will be activated. If the microprocessor sets the W and B/32 latch conditions, the lowest of the eight lines at 350a will be activated. The operations of the other six lines should be readily apparent.

The decoder outputs 350a extend via cables indicated generally at 351 and 352 to the other logic circuits in FIGS. 6a and 6b. The same outputs extend via cables 353 and 354 to the logic circuits in FIG. 6c. The same outputs extend via cables 351, 353 and 355 to logic circuit elements in FIG. 6d. Microprocessor direct control connections to the logic elements of control circuits 341–344, denoted as mp1–mp27, are applied to these circuits via lines 316, shown in FIGS. 6b, 6c and 6d which represent decoded output functions of the microprocessor control memory.

Referring to the "handshake" interface between CSB and the adapter, shown at 360 in FIG. 6a, lines 310 and 311, which respectively indicate the occupancy states of the high and low byte portions of cycle steal data register 305 (FIG. 5), extend at 361 to AND gates 362 and 363 which produce outputs on lines 314 and 315 for respectively clearing the high and low portions of register 305. These gates are prepared by signals on respective lines 310 and 311 indicating full status of respective high and low byte portions and then operated when enabling signals appear on respective input lines 364 and 365. Lines 364 and 365 are excited through respective OR gates 366 and 367 in association with logical conditions which respectively relate to gating of data words from CSB to adapter registers 140 and 141, or 143 and 144 (FIG. 4). The enabling signals produced by OR gates 366 and 367 are appropriately labeled load adapter high byte (abbreviated LA-HI) and load adapter low byte (abbreviated LA-LO). The logic for developing these enabling signals, indicated generally at 368, is discussed later.

Lines 310 and 311 have respective extensions 370 and 371 to an OR gate portion 372 (FIG. 6c) of port handshake activation logic 342. Lines 310 and 311 also have extensions 374 and 375 to logic circuits 376 (FIG. 6b) which develop indications of the full and empty conditions of the entire register 305 on lines 377 and 378 and of empty conditions of the low and high portions of that register on lines 379 and 380. Lines 377–380 also extend to logic element portions of the port handshake activation circuits 342 in FIG. 6c.

Latches 400 and 401 in FIG. 6a operate as toggles, or single-bit binary counters, in association with respective logic circuit inputs 402 and 403. These latches change state (are toggled) in association with partial transfer operations in the U/8 and B/32 modes. Each latch 400 and 401 has outputs labeled Q and $\overline{Q}$ respectively used as high and low pointers relative to portions of the funnel data path circuits. The $\overline{Q}$ output of each latch is fed back to the D input of the respective Latch so that on each pulsing of the respective CK input, the latch state is reversed and the states of the Q and $\overline{Q}$ outputs are reversed.

Figure 6D:
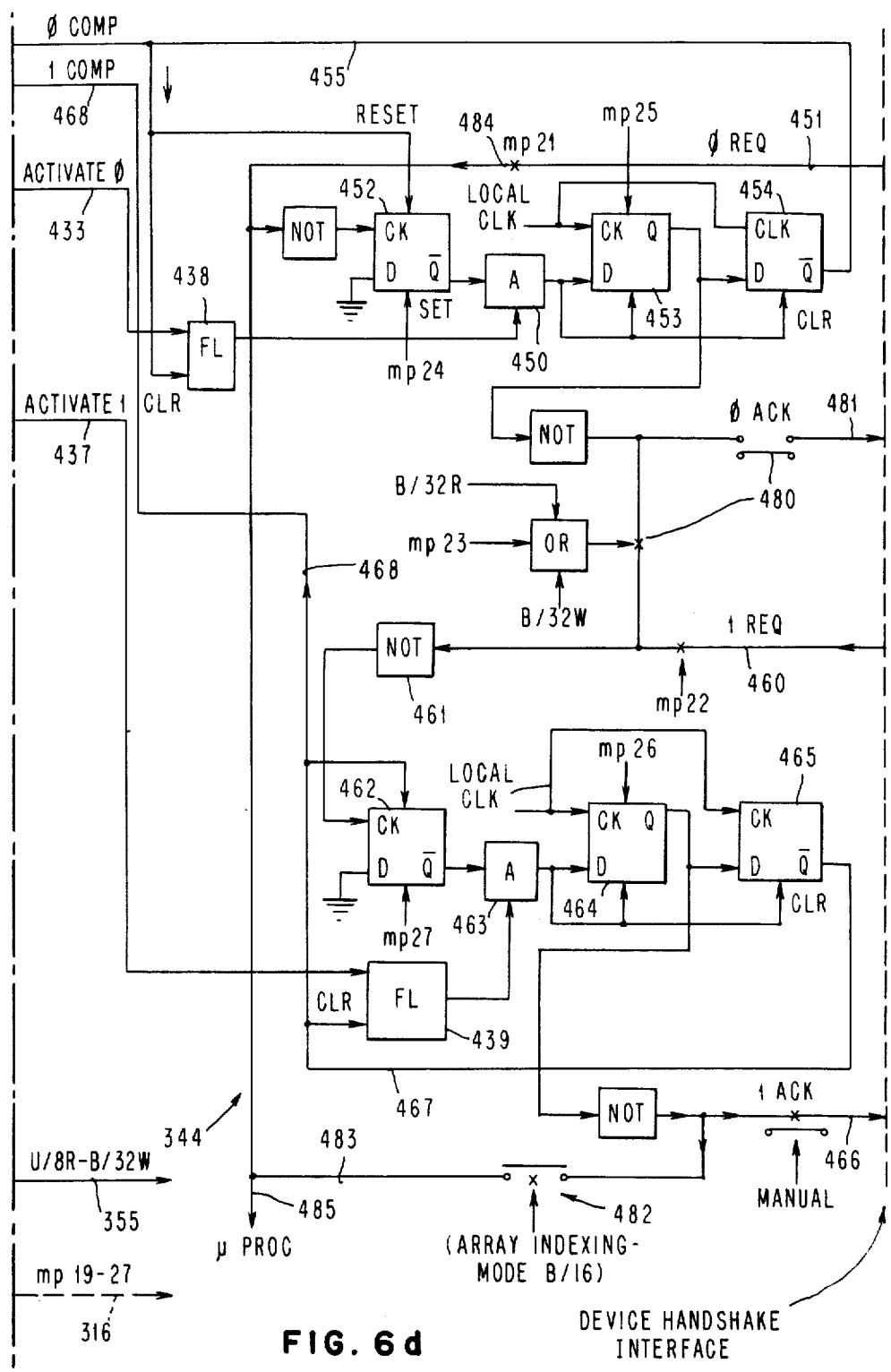

During 8-bit unidirectional Write operations logic 402 alternately triggers "funnel byte pointer" latch 400 to its high and low states (respectively FBP-HI and FBP-LO) with each activation of the port 0 handshake completion signal (0 COMP) controlled by circuits 344 (FIG. 6d). The 0 COMP signal is applied to logic 402 via line 404. When a unidirectional 8-bit Read operations is being performed, latch 400 switches between its high and low states when a port 1 handshake completion signal (1 COMP) is received from circuits 344 via line 405. Accordingly, for each byte transfer completed at port 150 (FIG. 4) during an 8-bit. Write operation, the state of byte pointer latch 400 is reversed. The latch 400 thereby operates effectively as an odd/even byte counter in association with byte transfers to port 150 from registers 140 and 141 (FIG. 4). Similarly, during 8-bit reading operations for each byte transferred in the reverse direction, from the device to adapter port 152, the state of latch 400 reverses causing the latch to operate as an odd/even byte counter relative to byte transfers from port 152 to registers 143 and 144 (FIG. 4).

Similarly, latch 401 operates relative to 32-bit bidirectional mode transactions as an odd/even counter for word (16-bit) transfers (hence its outputs are funnel word pointers high and low indicators, abbreviated FWP-HI and FWP-LO). Each time that a word is passed across either the port 0 or port 1 interface, a signal produced at the output of OR circuit 408 (FIG. 6a) is applied via line 409 to logic 403 causing latch 401 to reverse its state. In each 32-bit transaction there are discrete 0 COMP and 1 COMP signals returned as word portions of the 32-bit parallel term are presented at the interface. Accordingly, latch 401 will be toggled twice for each 32-bit transfer, once as the 0 port word portion is latched in registers 140 and 141 (for either a Write or a Read transaction) and again as the 1 port word portion is passed through latches 143 and 144 (for either a Read or a Write). Outputs of latches 400 and 401 are used to control portions of the handshake activation logic 342 (FIG. 6c), portions of the CSB handshake interface logic 341, and portions of the data path gating logic 343.

Logic 341 (FIG. 6a) comprises OR circuits 420 and 421 respectively associated with activation of lines 312 and 313, a group of four vertically arranged AND circuits 423 for controlling activation of OR circuits 420 and 421 and an OR circuit 424 which controls preparation of the third AND circuit from the top in the vertical group 423. OR circuit 420, when conditioned by one of the three uppermost AND circuits 423 activates line 312. This occurs when a Read operation is being executed in the 32-bit format and a completion indication is provided relative to either device port 0 or 1, or when an 8-bit Read operation is being conducted and latch 400 is set to its FBP-HI state and a completion indication arrives relative to port 1, or when a 16-bit Read operation is being conducted and a completion indication arrives relative to port 1. OR circuit 421 is conditioned by either of the two lowest positioned And circuits 423 to activate line 313 when a 16-bit Read operation is being conducted and a one port completion indication is given or when an 8-bit Read operation is being conducted and the byte pointer latch 400 is toggled to its LO state and a one completion indication is given. Accordingly, lines 312 and 313 will be activated whenever a word (16-bits) of data is passed from the device port interface to CSB during a Read operation, and these lines will be operated twice during each 32-bit Read operation as the two word portions of a 32-bit group are respectively channeled through the 0 and 1 port register groups shown in FIG. 4.

Logic 342 (FIG. 6c) contains OR circuit 430, three vertically stacked AND circuits 431 and additional AND and OR circuits indicated at 432. These circuits condition the Ø port handshakes (FIG. 6d) via line 433. Circuits 342 also include OR circuit 434, vertically stacked AND circuits 435 and logic indicated at 436 for activating the port 1 handshakes via line 437. When an activating pulse appears on line 433 (FIG. 6c) latch 438 (FIG. 6d) is set. When an activating pulse appears on line 437, latch 439 in FIG. 6d is set. Logic 430–432 sets latch 438 when any one of the following conditions occur: the high word pointer condition is set at latch 401 (FWP-HI) associated while CSDR (in the CSB subsystem) is empty and a 32-bit Read operation is being conducted, or a low word pointer condition is set (FWP-LO) and CSDR is full while a 32-bit Write operation is being conducted, or while an 8-bit Write operation is being conducted when either byte portion of the CSDR register is full (as indicated via OR circuit 372) or while a 16-bit Write operation is being conducted and CSDR is full.

Logic 434–436 activates the port 1 handshakes via line 437 when any of the following conditions is met: (a) funnel word pointer latch 401 is set to the low state and either CSDR becomes empty while a 32-bit Read operation is being conducted or CSDR becomes full while a 32-bit Write operation is being conducted, (b) either byte portion of CSDR becomes empty while an 8-bit Read operation is being conducted, (c) or CSDR becomes empty while a 16-bit Read operation is being conducted, or (d) CSDR becomes full while the 16-bit Write operation is being conducted in the bidirectional mode.

As mentioned previously, the Ø and 1 activation functions respectively set latches 438 and 439 (FIG. 6d). These latches prepare logic 344 for exchanging handshake signaling functions with the device in the following manner. Setting of latch 438 prepares AND circuit 450. When a device request is raised on the request line 451 associated with port 0, latch 452 is set to the state in which its output Q enables AND circuit 450. This causes latch 453 to be set to the state in which its Q output becomes active. Shortly thereafter, as determined by the local clocking inputs to latches 453 and 454, latch 454 is conditioned to the state in which its $\overline{Q}$ output goes active, causing Ø completion line 455 to be active. This, of course, feeds back through OR circuit 408 and the other logic circuits shown in FIG. 6a to affect related handshakes at the CSB interface, and related funnel byte and word pointer toggling operations. At the same time the Ø completion indication clears latch 438, deconditioning AND circuit 450 and preventing further changes in state of latches 453 and 454.

Similarly, setting of latch 439 in conjunction with presentation of a 1 port request signal through path 460, 461 produce an associated $\overline{Q}$ activation state in latch 462. This operates AND circuit 463 and sequentially stores latches 464 and 465 producing a timed acknowledgment pulse on line 466, and a 1 completion signal through line circuit paths 467 and 468. This signal is fed back to the logic 341 and the byte and word toggling functions in FIG. 6a.

A number of interesting aspects of the circuit indicated at 344 are that in the 32-bit transfer operations switches 480 are activated to tie the Ø acknowledgment function to the 1 request function. The Ø and 1 activation functions follow each other closely in time allowing early completion of the 32-bit parallel transfer and early release of the related Ø and 1 completion functions. In this mode of operation the device presents only Ø request signals and receives only 1 acknowlegment signals via line 466, and the Ø acknowledgment and 1 request lines 481 and 460 are effectively disconnected from the device port interface.

Another interesting aspect is that in the array indexing mode switch 482 transfers the 1 acknowledgment function to line 483, while at the same time switch 484 interrupts the path between the Ø request line 451 and the logical input to latch 452, so that each appearance of the 1 acknowledgment during an array indexing operation automatically raises a Ø request and thereby activates the Ø port handshakes for array address transfer. The extension of line 483 indicated at 485 is accessible to the microprocessor as suggested at 485 and, in effect, presents a request to the microprocessor for the transfer of an array address through the data path 140, 141 associated with port Ø. In this manner, array address functions are presented to the device at port Ø in parallel with the transfer of information to or from the device in the 16-bit bidirectional mode through the 1 port circuits 143 and 144 (FIG. 4).

Another interesting aspect of the control circuitry illustrated in FIG. 3 is that the decoded microprogram control functions MP1–MP27 passed from microprocessor 28 through cables 316 in FIGS. 6b–6d, are applied to the control circuitry shown in these figures so as to permit the microprocessor to exert step-by-step direct control over all adapter operations and thereby directly control data transfers between a device and either the microprocessor or CSB. Functions MP1–MP4 control the states of the byte pointer and word pointer toggle latches 400 and 401 in FIG. 6a. MP5 and MP6 are applied to OR circuits 430 and 434, FIG. 6b, for enabling the microprocessor to discretely control port handshake activation functions. MP7 through MP20 act via the OR gates in data path selection logic 343 to directly control any of the data paths in FIG. 4. MP21–MP27 condition the port handshake activation logic 344, FIG. 6d, permitting the microprocessor to directly control the port handshaking function of either or both the Ø and 1 ports.

It should now be apparent that the microprocessor and the autonomous controls 340, 350 can operate independently of each other to conduct data transfers relative to the Ø and 1 ports. Thus, the microprocessor, is able to conduct the array addressing function, in an array indexing operation, relative to port Ø while the autonomous controls are directing B/16 mode data transfer between port 1 and CSB. Also, in the programmable off-line mode the microprocessor is able to operate relative to either port Ø or port 1 to set up and conduct time-interleaved unidirectional 16-bit operations (Writes through port Ø, Reads through port 1).

Figure 7:
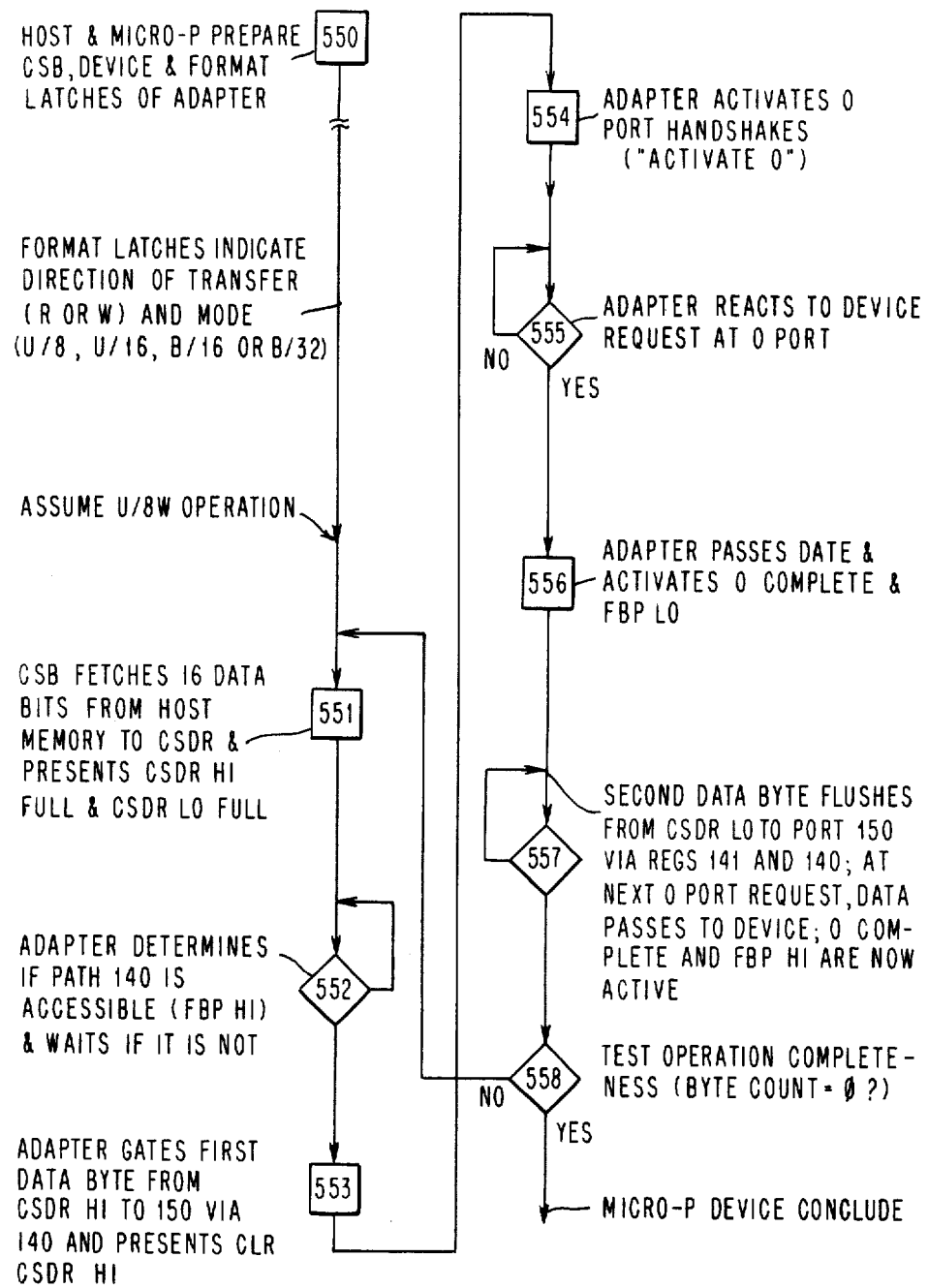

FIG. 7 illustrates the overall operation of the controls shown in FIG. 6 and the system shown in FIGS. 3 and 4 for conducting an autonomous mode 8-bit unidirectional Write operation through port Ø. Block 550 indicates the preparation of the CSB, device and adapter subsystems. Block 551 indicates that when the CSB cycle steal data register is full, CSB presents full indications (via lines 310 and 311, FIG. 6a). Decision point 552 and block 553 indicate that on the byte pointer high condition the adapter gates a data byte from the high byte portion of CSDR to port 150 via latch 140 and presents the high byte clearing signal to CSB. Block 554 represents that the adapter at this point activates its 0 port handshakes. Decision point 555 and block 556 indicate that when the 0 port device request arrives the adapter passes the data byte (now presented at port 150) to the device and activates its 0 complete and low byte pointer indications.

The low byte pointer indication causes the data byte contained in the low byte portion of CSDR to pass through registers 141 and 140 to port 150. Decision point 557 indicates that the second data byte is passed to the device when the next 0 port request arrives. With the passage of this second data byte the adapter sets its 0 complete and high byte pointer indications. At decision point 558 the state of completeness of the operation is tested and the operation is either concluded or the transfer operations 551 through 557 are repeated. This test of completeness may be conducted either by the microprocessor or by the adapter control logic.

CSB develops a "byte count equal 0" indication when its portion of the transfer operation is complete and signals such indication to the microprocessor. The microprocessor may then exercise control over the adapter operations (via its direct controls) to cause the operation to be concluded. Alternatively, the adapter may be equipped with a connection to the "byte count equals 0" indication of CSB and with logic responsive to that connection (not shown in FIG. 6) for indicating the ending condition to the microprocessor (via a not-shown connection) when the adapter has carried out the last byte transfer associated with the 0 byte count indication.

With either method, neither of each is directly relevant to the present invention, the microprocessor assumes responsibility for concluding the operations and presenting device status to the host system. The microprocessor may acquire the device status data by operating the adapter controls directly, or it may operate the adapter controls in part directly and in part in an autonomous fashion to move status data from the device interface to host storage via the adapter and CSB.

Figure 8:
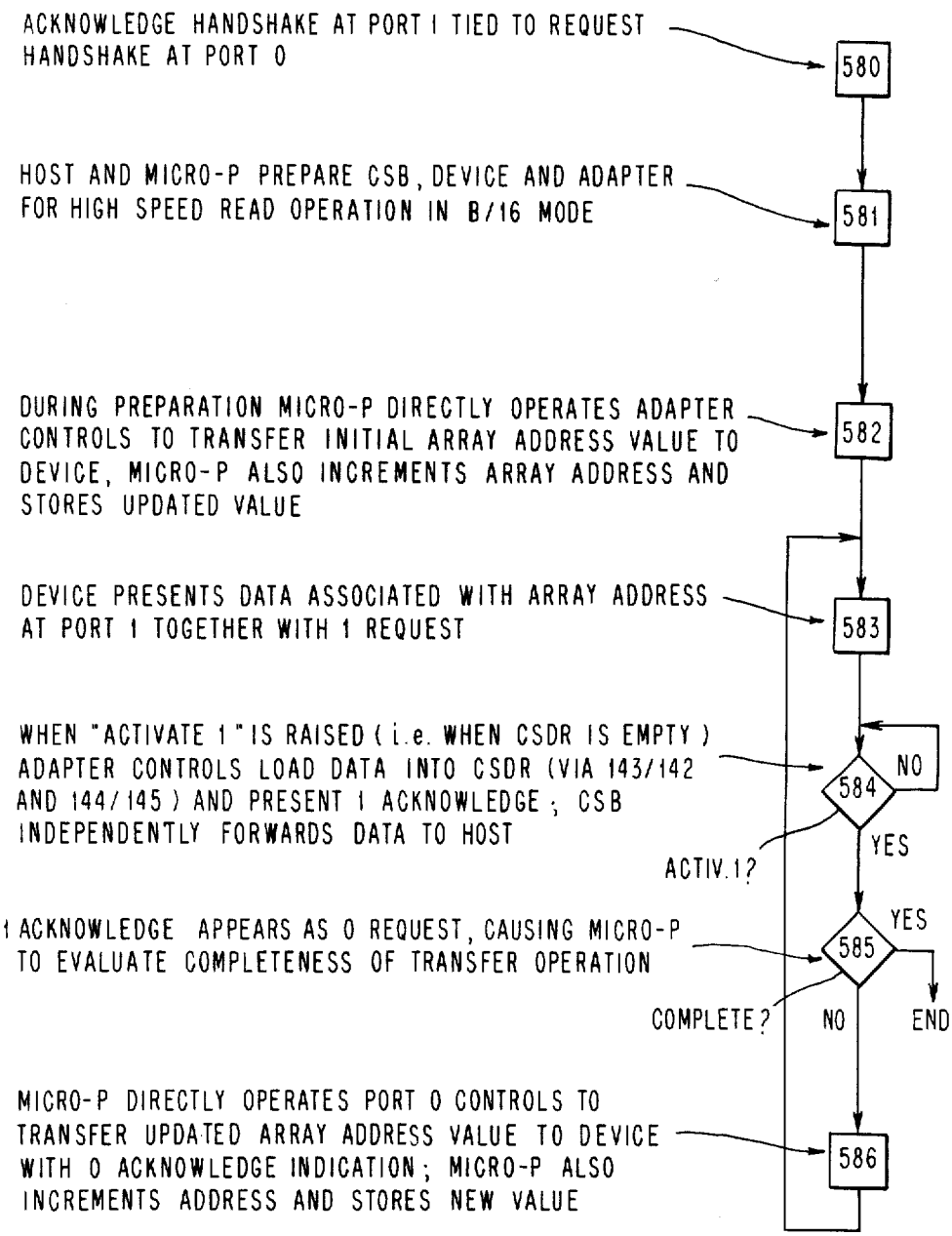

FIG. 8 illustrates a high speed Read operation conducted in the B/16 mode using the previously mentioned array indexing feature. Block 580 represents that for this type of operation the acknowledge handshake at port 1 is tied to the request handshake line of port 0 (see switch 482 and line 483 in FIG. 6c). As shown at 581 the host and microprocessor cooperate to prepare CSB, the device and the adapter for transferring a predefined data array (containing an arbitrary number of bytes arranged in an ordered array structure) between a memory in the device and a memory in the host system via adapter port 1 and a B/16 mode autonomous load operation. As shown at 582, during such preparation the microprocessor directly provides an initial array address value to the device, increments the value and stores the updated value.

As shown at 583, the device then presents data (from an array position defined by the initial array address function) at port 1 together with a 1 request. Decision 584 represents that when CSDR is empty the autonomous adapter controls are conditioned to load the device data into CSDR via paths 143/142 and 144/145, and present a 1 acknowledge signal. Thereafter CSB independently forwards the data from CSDR to the host memory system.

The 1 acknowledge function developed by the autonomous controls appears as a 0 request to the microprocessor (refer to block 580), causing the microprocessor to evaluate completeness of the transfer operation as suggested at 585. If the operation is complete (i.e. the entire array has been transferred), then the microprocessor concludes the operation in the manner described previously. If the data transfer operation is incomplete, the microprocessor directly operates the port 0 controls of the adapter to transfer the updated array address value to the device, together with a 0 acknowledgment indication, as suggested at 586. The microprocessor then increments the array address value and stores the new value The 0 acknowledgment indication, raised in conjunction with the 0 completion indication (see line 455, FIGS. 6b, 6c), clears the 0 activation function of latch 438 (FIG. 6c).

The adapter autonomous controls and the device and microprocessor repeat operation sequence 583–585, until the operation is complete or until it is terminated prematurely due to an abnormal condition.

Figure 9:
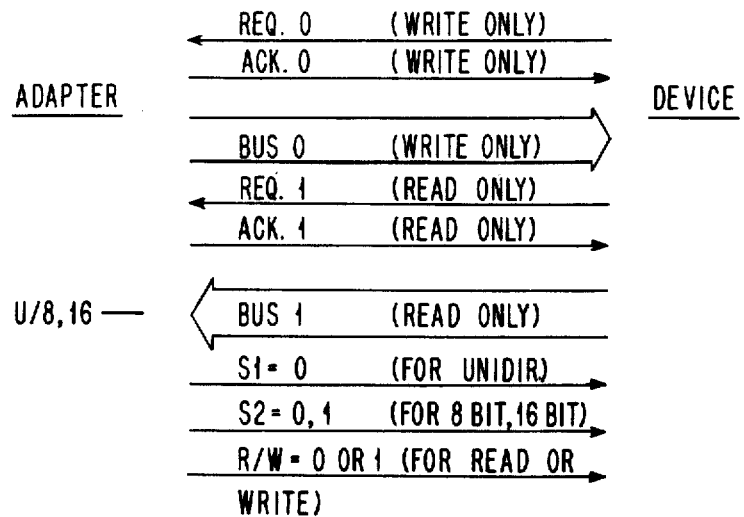
FIGS. 9–14 illustrate various configurations of the subject adapter and its sectional handshaking controls.

FIGS. 9–14 indicate various handshaking configurations at the adapter device port interface for sustaining the various data transfer operations which have been discussed. FIG. 9 indicates that the unidirectional mode Write and Read operations, and the associated 0 and 1 port handshaking functions operate entirely separately so that theoretically different data streams could be written out at the 0 port and read in at the 1 port simultaneously. In general, if such operations were conducted relative to CSB then individual transfers could not be carried out simultaneously inasmuch as CSB can only handle one data word transfer transaction at a time.

Figure 10:
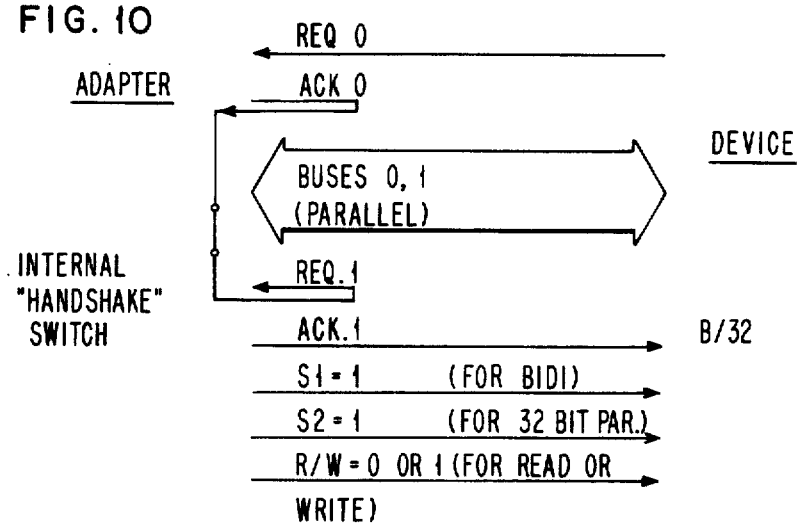

FIG. 10 indicates that during the 32-bit bidirectional mode high speed operations the 0 port acknowledgment line is tied to the 1 port request line for causing CSB and the adapter to transfer word portions of 32-bit data units in two discrete transactions while the same 32-bits pass across the device interface in a single parallel operation.

FIG. 11 illustrates the handshaking configuration for the 16-bit bidirectional high speed operation associated with array addressing as described above in respect to FIG. 8. In this configuration the 0 port acknowledgment function is tied to the 1 port request function, as explained previously. It should be noted that for ordinary 16-bit bidirectional mode operations without array addressing the 0 port handshaking lines are not linked to the 1 port handshaking lines. Accordingly, as the data is moved through the 1 port, the 0 port remains idle. Of course, with suitable microprogramming, the microprocessor may be able to operate the 0 port controls directly to transfer data between the microprocessor memory and the device while a 16-bit bidirectional mode operation is being conducted through the 1 port.

Figure 12:
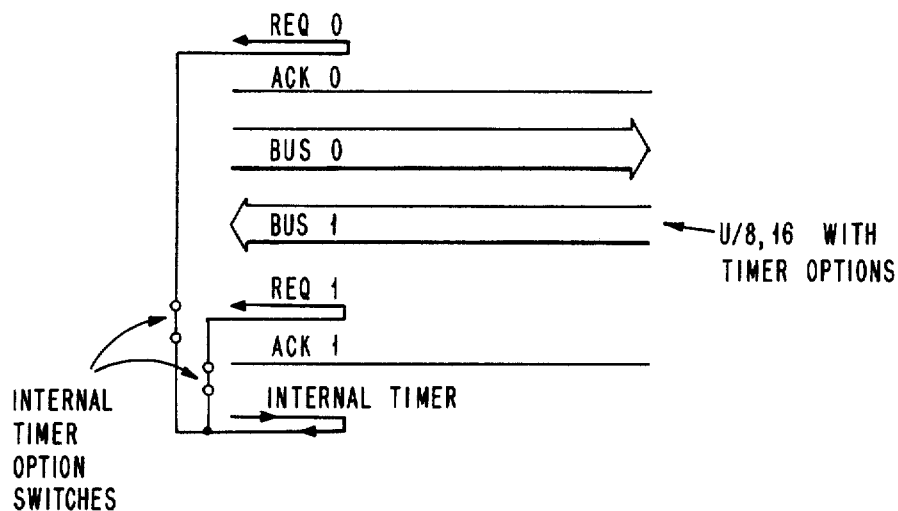

FIG. 12 illustrates an optional connection to either the 0 or 1 port request lines from an internal timer associated with or contained in the adapter interface controls 118 (FIG. 3). This timer may be used to operate the 0 or 1 request functions in a synchronous mode relative to the adapter in association with adapter communications with devices adapted for synchronous mode operation.

Figure 13:
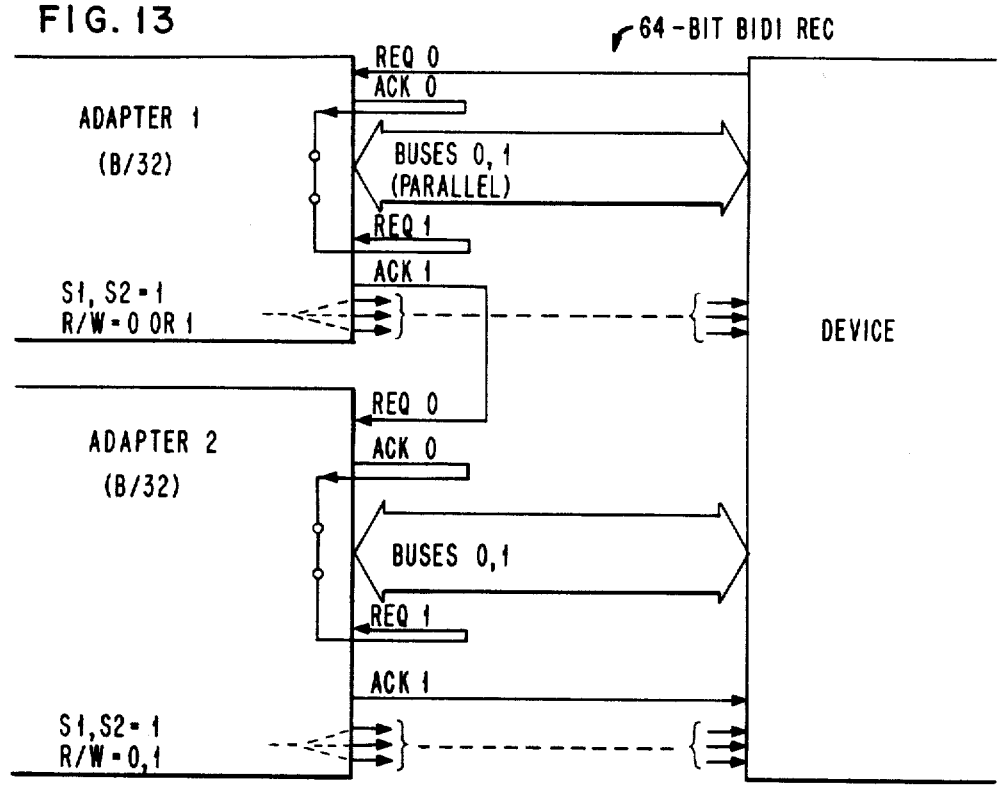

FIG. 13 illustrates interconnection of the 1 port acknowledgment line of one adapter to the 0 port acknowledgment line of another adapter for enabling the two adapters to operate relative to a single device to conduct data in a 64-bit parallel mode between a single device and either one or two host systems.

Figure 14:
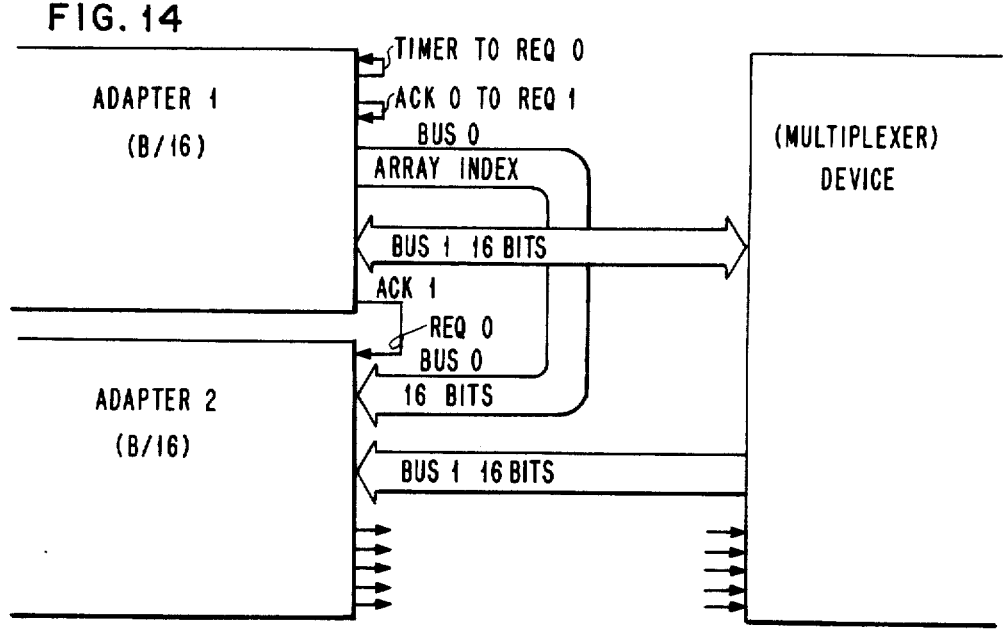

FIG. 14 indicates how two adapters may have their handshake controls linked for conducting a 32-bit bidirectional mode operation, each conducting a 16-bit bidirectional operation, relative to two data arrays having ordered associations. In this mode the array index operation is utilized by the first adapter to pass array addresses to the ∅ port data paths of the second adapter in order to maintain ordered correspondence between data transferring between the first adapter and the (multiplexer) device and data passing between the second adapter and the same device.

Those skilled in the art will readily appreciate other configurations that are sustainable by the subject adapter. Furthermore, those skilled in the art will recognize that the subject adapter concepts may be extended to provide for variable bit-parallel format selection at the host or CSB interface for enabling the adapter to communicate readily with host systems having 16 or 32-bit busing facilities. One way of accomplishing this would be to arrange two register configurations of the type shown in FIG. 4 "back-to-back" with their CSB interfaces tied together, the port interface of one of the adapters connecting to the host system and the port interface of the other adapter connecting to devices.

While there has been described what is at present considered to be a preferred embodiment of this invention, it will be obvious to those skilled in the art that various changes and modifications may be made therein without departing from the invention. It is, therefore, intended to cover all such changes and modifications in the following claims as falling within the true spirit and scope of the invention.

What is claimed is:

1. In an I/O controller having interfaces for transferring data between a host processor system and one or more peripheral devices, an improved interface adapter comprising:

format conversion circuit means connectable in various configurations between said host processor and devices for transferring data between said processor and devices in various bit width-parallel formats;

multi-state control means dedicated exclusively for controlling said format conversion circuit means; and means responsive to various transfer initiating signals produced under the direction of supervisory programs executed in said host system for variably conditioning said control means to sequence autonomously through various series of control states for causing said conversion circuit to transfer data between said host processor and said devices in various bit width-parallel formats pre-defined by said signals.

2. In an I/O controller having interfaces for transferring data between a host processor system and one or more peripheral devices, an improved adapter comprising:

first and second discretely separate format conversion circuit sections connectable in parallel between said host and device interfaces in various width bit-parallel formats;

multi-state control means dedicated exclusively for controlling said circuit sections; and means responsive to signals from said host system for applying command signals to said control means for defining various data transfer operations and associated bit-width formats;

said control means sequencing autonomously through various series of control states, in response to said applied command signals, for selectively causing one or both of said circuit sections to transfer various length blocks of data between said host system and a device in various width bit-parallel formats defined by the applied signals.

3. An interface adapter in accordance with claim 2 wherein said control means comprises:

first and second handshaking control circuit means respectively operating in association with said first and second format conversion circuit sections and connectable to the interface between said adapter and said devices for exchanging handshaking control signals with said devices through said interface; and means responsive to said applied signals for variably interconnecting said first and second handshaking means with each other and with said device interface, whereby said circuit sections may at times be operated to present discretely separate and independent circuit paths for transferring data relative to said devices, and at other times be operated effectively as a single unit to transfer data relative to any one of said devices in either a parallel or time-staggered form.

4. An interface adapter in accordance with claim 3 wherein said variably interconnecting means comprises:

gating means coupled between said first and second handshaking means for permitting selective formation of internal connections between said first and second handshaking means, and external connections between said first and second handshaking means and respective second and first handshaking means in other adapters, whereby said first and second handshaking means may be configured in plural said adapters to present a parallel interface of extended width to said devices.

5. An interface adapter in accordance with claim 3 wherein:

each of said first and second handshaking means contains means for receiving a request signal and means responsive to a received request signal for generating an acknowledge signal; said adapter including means for allowing external connections of the request signal receiving means in the first handshaking means and the acknowledge signal generating means in the second handshaking means to a device, via the device interface; and means allowing internal connection of the acknowledge signal generating means in the first handshaking means to the request signal receiving means in the second handshaking means; whereby acknowledge signals generated by said first handshaking means may be made to appear as device request signals to said second handshaking means and thereby enable said first and second conversion sections to transfer related data to or from the device interface in either a time-staggered or parallel mode.

6. In an I/O controller for transferring data between a host processor and one or more devices in various formats, said controller containing a microprocessor for interpreting commands prepared by said host processor and a cycle stealing bus circuit for transferring data between said host processor and devices in an autonomous manner after being prepared by said microprocessor, an improved peripheral interface adapter comprising:
- data transfer means for transferring data between said devices and either said microprocessor or said cycle stealing bus circuit or both said microprocessor and said bus circuit concurrently;
- control means dedicated exclusively for controlling said data transfer means; and
- means for applying various control signals from said microprocessor to said control means for causing said control means to operate autonomously to direct said data transfer means to transfer various amounts of data in various bit-parallel formats, between a device and either said microprocessor or said bus circuit or both said microprocessor and said bus circuit at the same time.

7. A peripheral interface adapter in accordance with claim 6 wherein said data transfer means comprises:
- first and second data transfer sections for transferring data between said devices and either said cycle stealing bus circuit or said microprocessor or both said bus circuit and microprocessor jointly;
- means for selectively transferring data in a predetermined first bit-width bit-parallel format from said cycle stealing bus circuit to either one of said transfer sections;
- means for selectively transferring data from either one of said sections to said cycle stealing bus circuit in said predetermined first bit-width format;
- means for selectively transferring data from said microprocessor to only one of said sections and not to the other one of said sections in a predetermined second bit-width bit-parallel format different from said first bit-width format;
- means for selectively transferring data from said other one of said sections to said microprocessor in said second bit-width format; and
- means for transferring data from said one of said sections to said other one of said sections in said second bit-width format.

8. An adapter in accordance with claim 6 wherein said control means includes:
- means for controlling termination of a data transfer operation in response to a terminating signal presented either by said microprocessor or said device.

9. An adapter in accordance with claim 7 wherein said control means recited in claim 6 includes:
- first and second handshaking means respectively associated with said first and second data transfer sections; and
- means for variably interconnecting said handshaking means with each other and with handshaking control lines in the interface between said adapter and said devices for configuring said handshaking means and said data transfer sections in various data transferring configurations relative to said devices for sustaining transfers between any of said devices and either said bus circuit or said microprocessor in either one of said first and second bit-width formats.

10. In an I/O controller containing an integral microprocessor for interpreting I/O commands prepared by a host processor, and a bypass bus circuit conditionable by said microprocessor for autonomously transferring varied-length data records between said host processor and one or more devices in a cycle stealing mode, an improved adapter for interfacing between said devices and said bus and microprocessor, comprising:
- sectionable register means for staging data in transit between a device and either said microprocessor for said bus circuit or both in bit-parallel groups of varying bit widths; and
- means for variously connecting sections of said register means to said microprocessor and bus circuit for permitting data to be transferred between said device and either said host processor or said microprocessor, or both, in various bit-width bit-parallel formats.

11. In an I/O controller containing an integral microprocessor for interpreting commands prepared by a host processor and containing a bypass bus circuit conditionable by said microprocessor for autonomously operating to transfer varied-length data records between said host processor and one or more devices in a cycle stealing mode, an improved interface adapter comprising:
- means for staging data for bit-parallel transfer to or from a said device in various bit-width parallel formats; and
- selective connecting means for connecting said staging means variously with said bus circuit and/or said integral microprocessor for exchanging data with said host processor and microprocessor in various bit-width parallel formats.

12. In an I/O controller packageable on an LSI circuit card, said controller integrally containing a microprocessor for interpreting commands prepared by a host processor, and a cycle stealing bus circuit having dedicated controls conditionable by said microprocessor in response to various said commands for operating autonomously to transfer data between said host processor and a peripheral device interface, an improved interface adapter for transferring data in various bit-parallel formats between said device interface and either said bus circuit or said microprocessor or both, comprising:
- register means having discretely separate first and second sections, each connectable for transferring data bidirectionally between said device interface and said bus circuit, one of said sections being connectable to said microprocessor only for transferring data unidirectionally from said microprocessor to said device interface and the other section being connectable to said microprocessor only for transferring data unidirectionally to said microprocessor from said device interface; and
- multi-state control means dedicated exclusively for controlling operations of said register means, said control means containing sequence control means responsive to various command signals from said microprocessor for operating said sequence control means through various sequences of states, and handshaking control means variously connectable to said device interface for causing data to be transferred bidirectionally between said register means sections and said device interface in various width bit-parallel formats;
- said handshaking means comprising discrete first and second sets of request and acknowledge circuits, means for selectively interconnecting the acknowledge circuit in the first set with either a device via said interface or the request circuit in the second set, and means for connecting the request circuit of the first set and the acknowledge circuit of the second set to said device.

* * * * *